US008102409B2

(12) United States Patent
Koyama et al.

(10) Patent No.: US 8,102,409 B2
(45) Date of Patent: *Jan. 24, 2012

(54) PRINTER DEVICE

(75) Inventors: Noboru Koyama, Tokyo (JP); Tetsuya Hoshino, Tokyo (JP)

(73) Assignee: Sony Corporation, Tokyo (JP)

( * ) Notice: Subject to any disclaimer, the term of this patent is extended or adjusted under 35 U.S.C. 154(b) by 860 days.

This patent is subject to a terminal disclaimer.

(21) Appl. No.: 11/717,073

(22) Filed: Mar. 13, 2007

(65) Prior Publication Data

US 2007/0229642 A1 Oct. 4, 2007

(30) Foreign Application Priority Data

Mar. 31, 2006 (JP) ................................ 2006-100709

(51) Int. Cl.
*G01D 15/10* (2006.01)
*G01D 15/06* (2006.01)

(52) U.S. Cl. ......................... 347/177; 347/164; 347/165

(58) Field of Classification Search .................. 347/178, 347/189, 190, 191, 194, 164–165, 177
See application file for complete search history.

(56) References Cited

U.S. PATENT DOCUMENTS 6,727,932 B2 * 4/2004 Enomoto et al. .............. 347/188
7,061,516 B2 * 6/2006 Otaka et al. .................. 347/178

FOREIGN PATENT DOCUMENTS

JP 61-256862 A 11/1986
JP 06-340136 12/1994
JP 09-187977 7/1997
JP 2002-205420 A 7/2002
JP 2003-063047 A 3/2003
JP 2003063047 A * 3/2003
JP 2005-271207 A 10/2005

OTHER PUBLICATIONS

Japanese Office Action issued May 11, 2010 for corresponding Japanese Application No. 2006-100709.

* cited by examiner

*Primary Examiner* — Stephen D Meier
*Assistant Examiner* — Sarah Al Hashimi
(74) *Attorney, Agent, or Firm* — Rader, Fishman & Grauer PLLC

(57) ABSTRACT

A printer device that prints an image to a printing paper using a thermal head formed with a plurality of heating resistors. The printer device includes: edge position detection means for performing edge position detection, at four corners, to an incoming printing paper using the thermal head based on a change of temperature increase observed in, as a result of energization, any of the heating resistors opposing the printing paper and the remaining heating resistors not opposing the printing paper; and control means for exercising control over an image printing operation using the thermal head based on a detection output derived by the edge position detection means.

7 Claims, 34 Drawing Sheets

PRINTER DEVICE

CROSS REFERENCES TO RELATED APPLICATIONS

The present invention contains subject matter related to Japanese Patent Application JP 2006-100709 filed in the Japanese Patent Office on Mar. 31, 2006, the entire contents of which being incorporated herein by reference.

BACKGROUND OF THE INVENTION

1. Field of the Invention

The present invention relates to a printer device that prints an image to a printing paper using a thermal head formed with a plurality of heating resistors.

2. Description of the Related Art

A printer device for printing images and characters to a printing medium includes a thermal-transfer type of sublimating a coloring material of an ink layer formed to one surface of an ink ribbon, and thermally transferring the coloring material to the printing medium so that color images and characters are printed. The printer device of such a type is provided with a thermal head formed with a plurality of heating resistors for use to thermally transfer the coloring material of the ink ribbon to a printing paper, and a platen disposed at a position opposing the thermal head for supporting the ink ribbon and the printing paper.

In such a printer device, the ink ribbon is put together with the printing paper in such a manner that the ink ribbon comes on the thermal head side, and the printing paper comes on the platen side. The ink ribbon and the printing paper are made to run between the thermal head and the platen while being pressed against the thermal head by the platen. At this time, in the printer device, the ink ribbon running between the thermal head and the platen is applied with the thermal energy from the underside to the ink layer thereof. The thermal energy is used to sublime the coloring material so that the coloring material is thermally transferred to the printing paper. In such a manner, color images and characters are printed.

For more details, refer to Patent Document 1 (JP-A-6-340136), and Patent Document 2 (JP-A-9-187977).

SUMMARY OF THE INVENTION

A printer device of previous type uses a CCD (Charge-Coupled Device) line sensor or others for edge position detection of a printing paper. This is aimed to go through an image printing process in an adaptive manner to the angle of an incoming printing paper.

It is thus desirable to achieve, in a printer device that prints an image to a printing paper using a thermal head formed with a plurality of heating resistors, being aware of the fact that the heating resistors vary in resistance value depending on the temperature, high-speed edge position detection at four corners of the printing paper with no need for a specifically-designed CCD line sensor or others.

These and other objects and specific advantages of the present invention will become more apparent from the following detailed description of an embodiment.

According to an embodiment of the present invention, there is provided a printer device that prints an image to a printing paper using a thermal head formed with a plurality of heating resistors. The printer device includes: edge position detection means for performing edge position detection, at four corners, to an incoming printing paper using the thermal head based on a change of temperature increase observed in, as a result of energization, any of the heating resistors opposing the printing paper and the remaining heating resistors not opposing the printing paper; and control means for exercising control over an image printing operation using the thermal head based on a detection output derived by the edge position detection means.

In the embodiment of the invention, in a printer device that prints an image to a printing paper using a thermal head formed with a plurality of heating resistors, being aware of the fact that the thermal resistance varies depending on the temperature of heat-producing elements, the need for any other sensor is eliminated for edge position detection at four corners of a printing paper. Moreover, the edge position detection can be performed with more stability by estimating, based on the detection result derived for a first corner, an edge position for a second and later corners using a paper width, and by performing the edge position detection with the resulting narrower detection range.

DETAILED DESCRIPTION OF THE INVENTION

In the below, an embodiment of the invention is described in detail by referring to the accompanying drawings. The following description is in all aspects illustrative and not restrictive, and it is understood that numerous other modifications and variations can be arbitrarily devised without departing from the scope of the invention.

Figure 1:
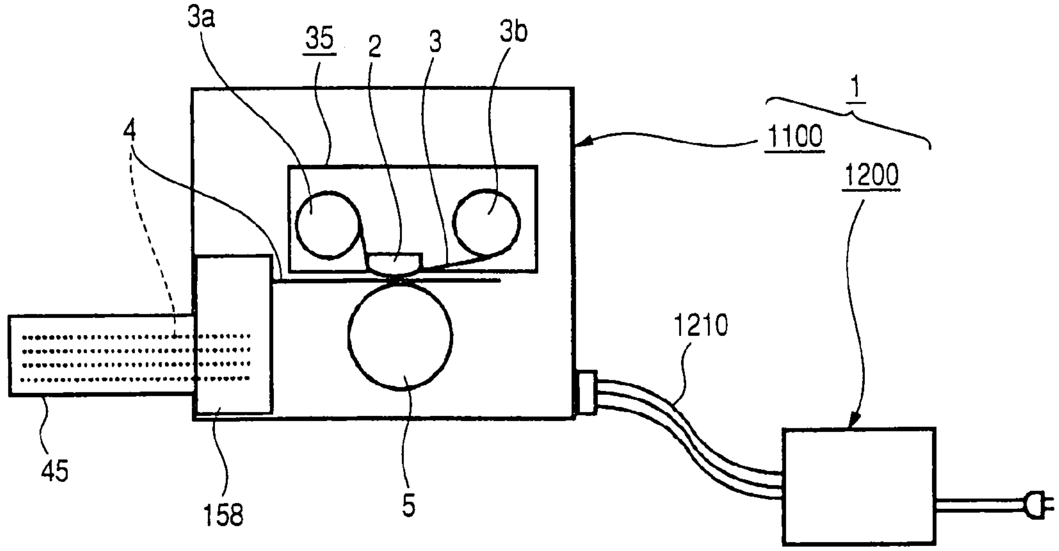
FIG. 1 is a schematic diagram showing the overall configuration of a printer device to which the invention is applied.

The invention is applied to a printer device 1 of such a configuration as shown in FIG. 1, for example.

This printer device 1 is attached with an ink ribbon cartridge 35, which carries therein an ink ribbon 3. The printer device 1 includes a thermal head 2 formed with a plurality of heating resistors, and a platen roller 5 that is disposed at the position opposing the thermal head 2. Between the thermal head 2 and the platen roller 5, the ink ribbon 3 and a printing paper 4 are made to run so that the ink ribbon 3 receives the thermal energy from the thermal head 2. In this manner, the coloring material of the ink ribbon 3 is thermally transferred to the printing paper so that the printing paper 4 is printed with images. Such a printer device 1 of sublimation type is provided with a printer device body 1100 being substantially rectangular, and an external power supply device 1200. The device body 1100 is attached with a printing paper tray 45 carrying thereon the printing paper 4 and the ink ribbon cartridge 35, and transfers, for printing, the printing paper 4 from/to inside to/from outside. The external power supply device 1200 is externally connected to the device body 1100 via a power supply cable 1210.

Figure 2:
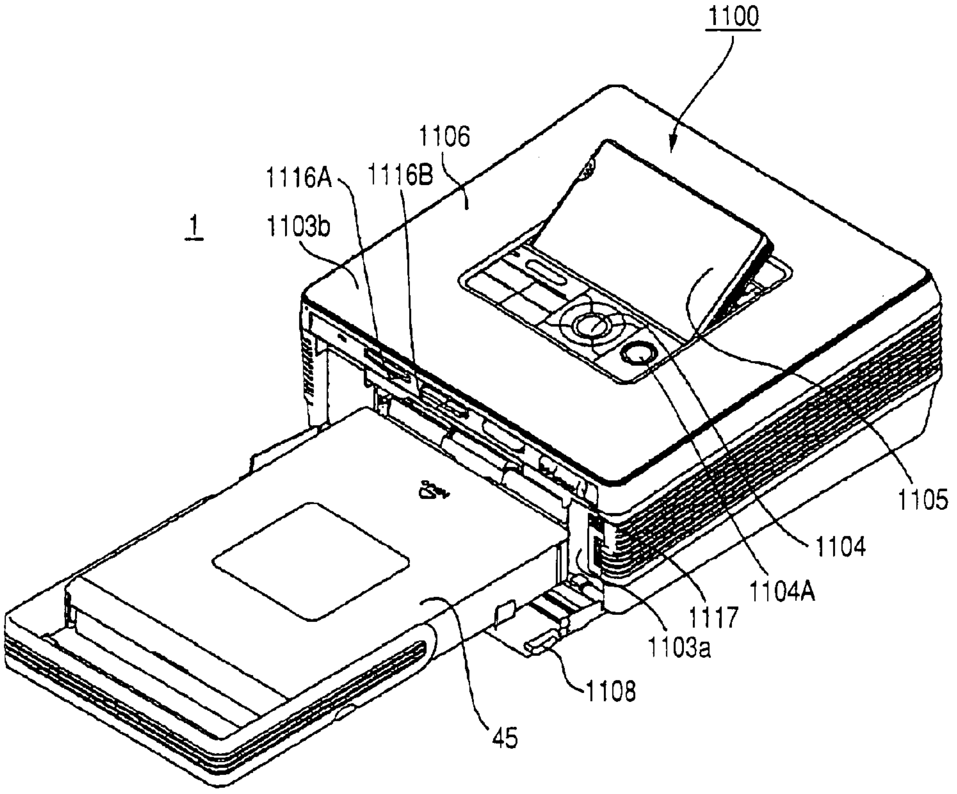
FIG. 2 is an external perspective view of the printer device with a top plate closed.
Figure 3:
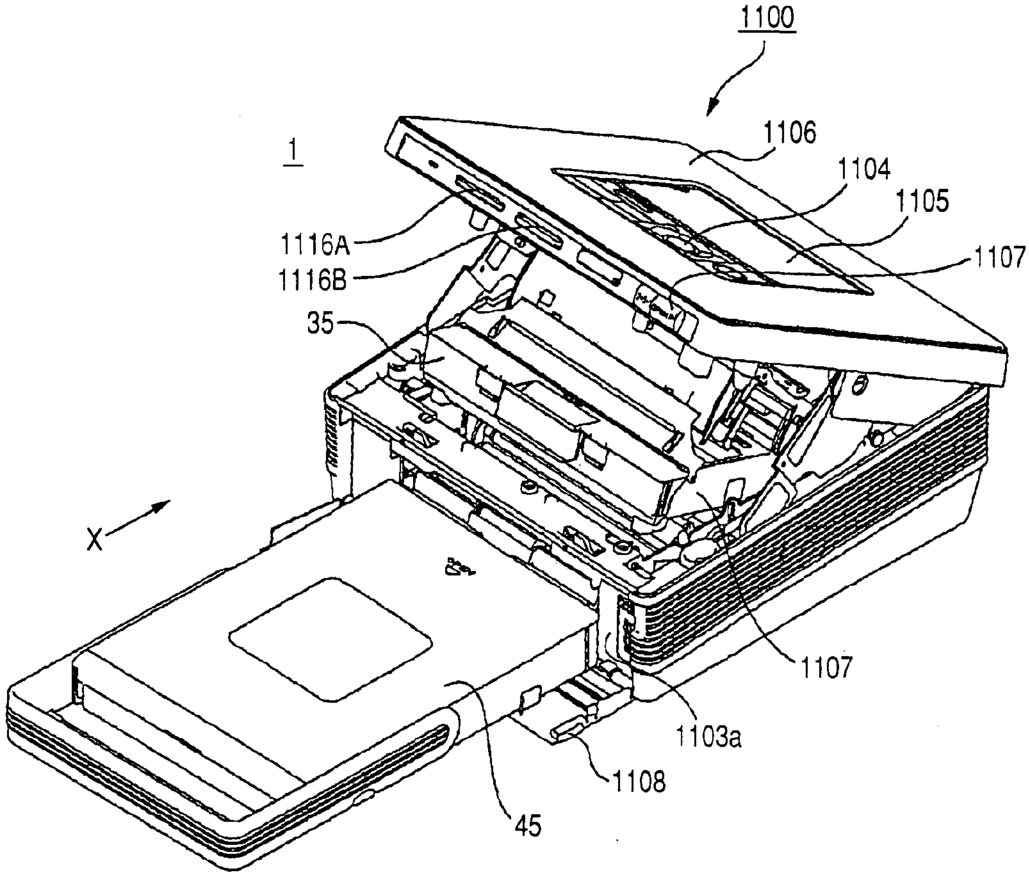
FIG. 3 is another external perspective view of the printer device with the top plate opened.

In the printer device 1, as shown in FIG. 2, an aperture section 1108 is formed to a front surface 1103*a* of the device body 1100 for attachment of the printing paper tray 45, which carries thereon the printing paper 4. With the aperture section 1108 formed as such, the printing paper 4 is inserted to and ejected from the device body 1100 from the side of the front surface 1103*a*. As shown in FIG. 3, the printer device 1 includes a top plate 1106 that is provided to be able to freely rotate in the vertical direction, and configures an upper surface 1103*b* of the device body 1100. When the top plate 1106 is rotated upward, an ink ribbon cartridge holder 1107 is rotated upward together with the top plate 1106, and made to face the outside from the side of the front surface 1103*a* so that the ink ribbon cartridge 35 is inserted to and removed from the side of the front surface 1103*a*.

The printer device 1 then receives image information from any recording media attached to slots 1116A and 1116B provided to the device body 1100 for use by the recording media or any recording media varying in type, e.g., digital still camera connected via USB, or others. Based on the image information, the thermal head 2 applies the thermal energy to the ink ribbon 3, and the printing paper 4 on the printing paper tray 45 is transferred. As such, any predetermined image is printed.

In the device body 1100, the top plate 1106 configuring the upper surface 1103*b* is provided with an operation panel 1104 for use of the printer device 1, and an LCD panel 1105 for display of images for printing or others. The top plate 1106 is attached with a top chassis, and is configured to be able to rotate in the vertical direction together with the ink ribbon cartridge 1107 connected with the top chassis.

The device body 1100 is provided with, on the front surface 1103*a*, the aperture section 1108, the slots 1116A and 1116B for use of recording media, and an open butt on 1117. The aperture section 1108 is attached with the printing paper tray 45 carrying thereon the printing paper 4. The slots 1116A and 1116B are attached with various types of recording media, and the open button 1117 is used to rotate upward the top plate 1106. The aperture section 1108 is so configured as to be freely opened or closed by a shutter 1108, and when the shutter 1108 is opened, the printing paper tray 45 is attached thereto.

The printer device 1 is made ready for a printing operation in the following manner. That is, the printer paper tray 45 is attached from the aperture section 1108, and the open button 1117 is operated so that the top plate 1106 is rotated upward. In response thereto, the ink ribbon cartridge 35 is attached to the ink ribbon cartridge holder 1107 being made to face the side of the front surface 1103*a*, and the top plate 1106 is put back to the side of the device body 1100. The printer device 1 is capable of various types of operations, e.g., selection of images for printing, setting of paper size, setting of the number of copies, or starting and stopping of a printing process. Such operations are executed through operation of the operation panel 1104 with images displayed on the LCD panel 1105, i.e., images recorded on a recording medium, or images recorded on various types of recording devices, e.g., memory device or digital still camera, connected via USB or others.

Such a printer device 1 is so configured as to allow the printing paper 4 to be inserted to and ejected from the side of the front surface 1103*a*, and the ink ribbon cartridge 35 to be inserted to and removed from the side of the front surface 1103*a*. With such a configuration, compared with a printer device in which an ink ribbon cartridge is inserted to and removed from the side surface of the device body, there is no more need to keep some space on the side surface side of the device body for insertion and removal of the ink ribbon cartridge 35. The printer device 1 thus does not need that much space for placement, thereby favorably increasing the users' usability.

What is more, the users are allowed to face the front of the device body 1100 to insert and remove the ink ribbon cartridge 35 to/from the ink ribbon cartridge holder 1107 formed on the side of the front surface 1103*a* of the device body 1100, whereby the users find it easy to go through the insertion/removal operation. Moreover, compared with a printer device in which an ink ribbon cartridge is inserted to and removed from the side surface of a device body, the printer device 1 allows disposition of a transfer mechanism for the printing paper 4, a running mechanism for the ink ribbon 3, or others on the side surface portion of the device body 1100. Also with the printer device 1, the thermal head 2 can face the ink ribbon 3 simultaneously with the attachment of the ink ribbon cartridge 35.

The ink ribbon cartridge 35 for attachment to the printer device 1 is configured by a supply spool 16, a take-up spool 17, and a cartridge body. The supply spool 16 is wound with the ink ribbon 3 formed with a coloring material layer, which is to be transferred to the printing paper 4. The take-up spool 17 is in charge of taking up the ink ribbon 3. The cartridge body is provided for housing therein the supply spool 16 wound with the ink ribbon 3, and the take-up spool 17.

Figure 4:
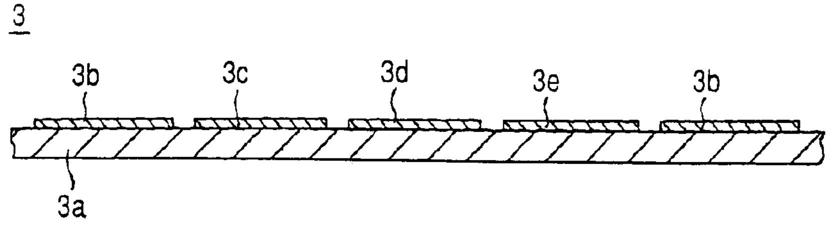
FIG. 4 is a cross sectional view of an ink ribbon.

As shown in FIG. 4, the ink ribbon 3 is so configured that a base material 3*a* is provided with, on one surface, coloring material layers 3*b*, 3*c*, and 3*d*, and a protection layer 3*e*. The base material 3*a* is a synthetic resin film such as polyester film or polyethylene film. The coloring material layers 3*b*, 3*c*, and 3*d* are each formed by a coloring material and a thermoplastic resin, and the protection layer 3*e* is formed by the same thermoplastic resin as that of the coloring material layers 3*b*, 3*c*, and 3*d*, for example. The coloring material is of various colors forming an image, e.g., yellow (Y), magenta (M), and cyan (C). The coloring material layers 3*b*, 3*c*, and 3*d*, and the protection layer 3*e* are provided repeatedly in a row in the longitudinal direction at regular intervals. As such, the base material 3*a* includes a set of the coloring material layers 3*b*, 3*c*, and 3*d*, and the protection layer 3*e* arranged in this order in the longitudinal direction. In response to the thermal energy applied by the thermal head 2 to suit image data to be printed, the coloring material layers 3*b*, 3*c*, and 3*d*, and the protection layer 3*e* are thermally transferred in a sequential manner to a reception layer of the printing paper 4.

Such an ink ribbon 3 is provided for use to print a piece of image using the coloring material layers 3*b* to 3*d* of yellow (Y), magenta (M), and cyan (C), and the protection layer 3*e*. One end portion of the ink ribbon 3 is latched to the supply spool 16, and the other end portion thereof is wound around the take-up spool 17. As a printing job proceeds, the ink ribbon 3 sequentially comes from the supply spool 16, and is taken up by the take-up spool 17.

The ink ribbon 3 for use in the invention is not restricted in configuration as long as the ink ribbon includes at least a coloring material layer and a protection layer. For example, the ink ribbon 3 may be configured by a coloring material layer of black (K) and a protection layer, or may be configured by coloring material layers of yellow (Y), magenta (M), cyan (C), and black (K), and a protection layer.

Figure 5:
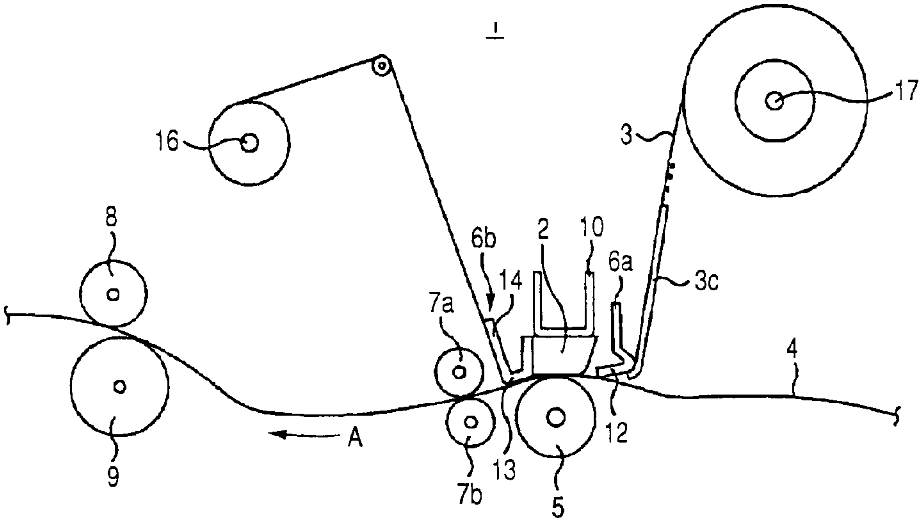
FIG. 5 is a schematic diagram showing the internal configuration of the printer device.

As shown in FIG. 5, the printer device 1 is configured to include the thermal head 2, the platen roller 5, a plurality of ribbon guides 6*a* and 6*b*, a pinch roller 7*a* and a capstan roller 7*b*, and a paper feed/eject roller 8 and a transfer roller 9. The platen roller 5 is disposed at a position opposing the thermal head 2, and the ribbon guides 6*a* and 6*b* serve to guide the running of the attached ink ribbon 3. The pinch roller 7*a* and the capstan roller 7*b* work together to make the printing paper 4 to run, together with the ink ribbon 3, between the thermal head 2 and the platen roller 5. The paper feed/eject roller 8 and the transfer roller 9 work together to pull out the printing paper 4 from the printing paper tray 45 attached from the front surface 1103*a* of the device body 1100 for transferring the printing paper 4 to the side of the thermal head 2, and eject the image-printed printing paper 4.

Figure 6:
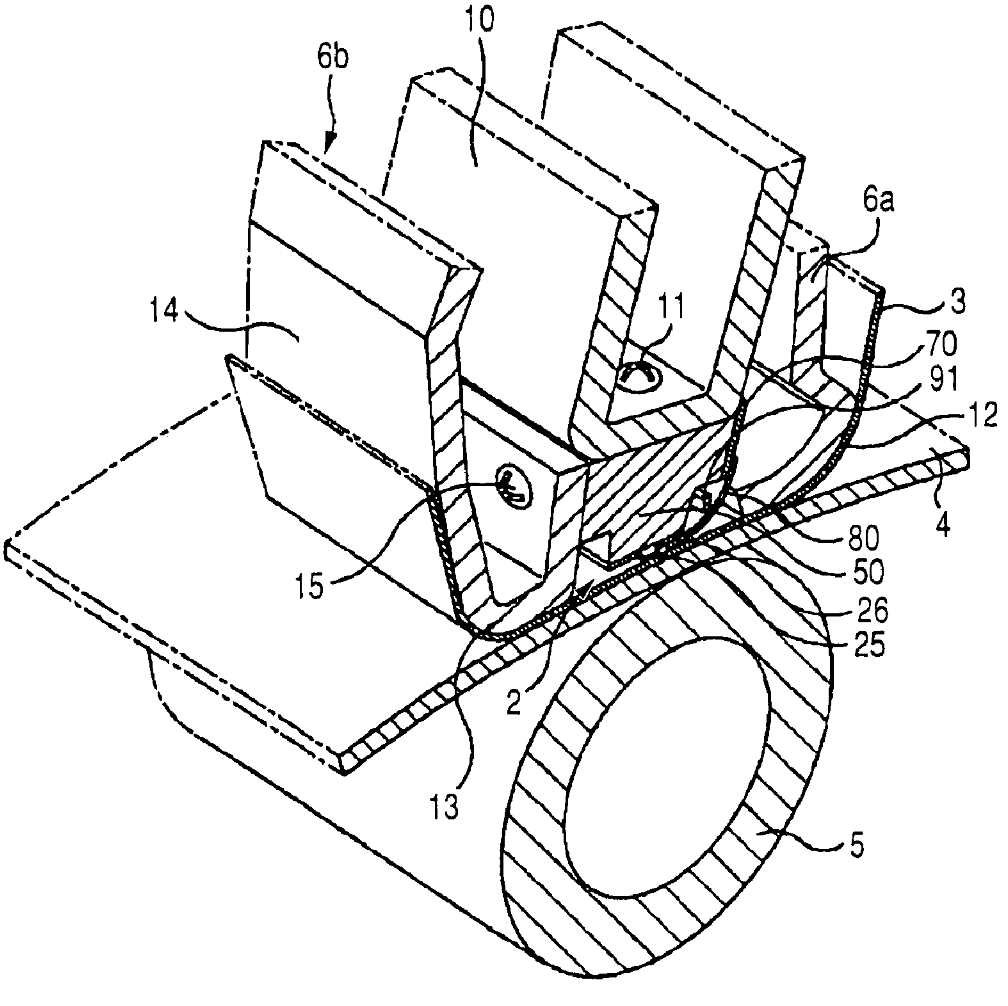
FIG. 6 is a perspective view of the printer device, showing the relationship between a thermal head and a ribbon guide.

As shown in FIG. 6, the thermal head 2 is attached to the printer device 1, i.e., an attachment member 10 on the cabinet side, using a fixation member 11 exemplified by a screw or others. The ribbon guides 6*a* and 6*b* serving to guide the ink ribbon 3 are disposed at the front and rear of the thermal head 2, i.e., on the side of the thermal head 2 from which the ink ribbon 3 comes, and on the side thereof to which the ink ribbon 3 is ejected. The ribbon guides 6*a* and 6*b* guide the ink ribbon 3 and the printing paper 4 at the front and rear of the thermal head 2 in such a manner that the overlapping pile of the ink ribbon 3 and the printing paper 4 abut the thermal head 2 in the substantially vertical direction. Through such guiding, the ribbon guides 6*a* and 6*b* serve well to make the ink ribbon 3 receive the thermal energy of the thermal head 2 without fail.

The ribbon guide 6*a* is disposed on the side from which the ink ribbon 3 enters with respect to the thermal head 2. The lower end side of this ribbon guide 6*a* is curved, i.e., surface 12. This surface 12 serves to direct the ink ribbon 3 between the thermal head 2 and the platen roller 5. The ink ribbon 3 is the one provided from the supply spool 16 disposed above the thermal head 2. The ribbon guide 6*b* is disposed on the side from which the ink ribbon 3 is ejected with respect to the thermal head 2. This ribbon guide 6*b* includes a flat section 13 and a peeling section 14. The flat section 13 is formed flat at the lower end, and the peeling section 14 stands substantially vertical from the end portion of the flat section 13 opposite to the thermal head 2 to peel off the ink ribbon 3 from the printing paper 4. This ribbon guide 6*b* serves to peel off the ink ribbon 3 from the printing paper 4 first by cooling off the ink ribbon 3 after thermal transfer in the flat section 13, and then by rising the ink ribbon 3 substantially perpendicular to the printing paper 4 in the peeling section 14. Such a ribbon guide 6*b* is attached to the thermal head 2 using a fixation member 15 exemplified by a screw or others.

In the printer device 1 of such a configuration, while the platen roller 5 is being pressed against the thermal head 2, the take-up spool 17 is rotated in the direction of taking up the ink ribbon 3 so that the ink ribbon 3 is made to run between the thermal head 2 and the platen roller 5 in the take-up direction. The printing paper 4 is then pinched between the pinch roller 7*a* and the capstan roller 7*b*, and the capstan roller 7*b* and the paper feed/eject roller 8 are rotated in the direction of paper ejection, i.e., the direction of an arrow A in FIG. 1, so that the printing paper 4 is made to run in the paper-ejection direction. At the time of printing, first of all, the thermal head 2 applies the thermal energy to a layer of the ink ribbon 3, e.g., a yellow-ink layer, and the coloring material of yellow is thermally transferred to the printing paper 4, which is running together with the ink ribbon 3 with the overlap therebetween. After the thermal transfer of the coloring materials of yellow, a coloring material of magenta is thermally transferred to the image formation section, and then a coloring material of cyan follows. To the image formation section, a laminating film is then thermally transferred so that color images and characters are printed.

The thermal head 2 for use of such a printer device 1 is capable of performing image printing to the printing paper 4 with or without margins in the direction orthogonal to the running direction thereof, i.e., at both ends of the printing paper 4 in the width direction.

Figure 7:
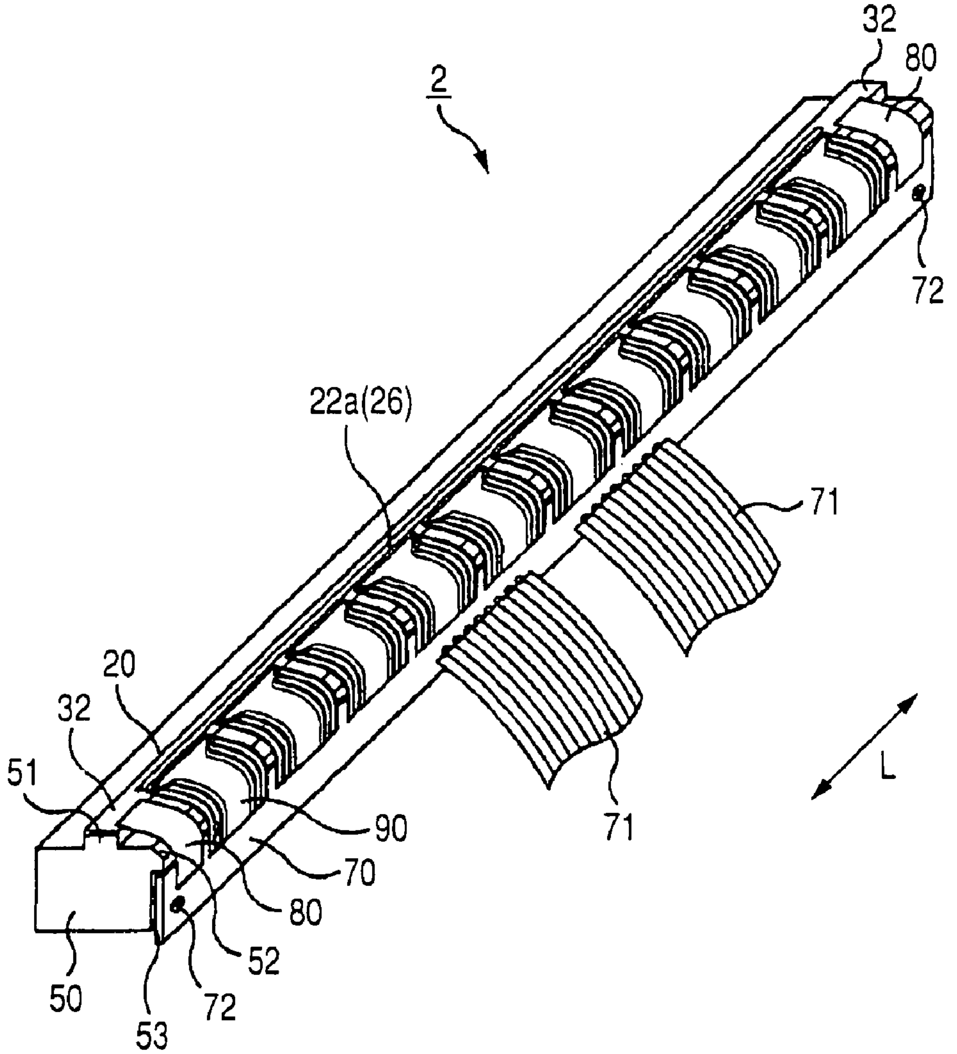
FIG. 7 is an external perspective view of the thermal head.
Figure 8:
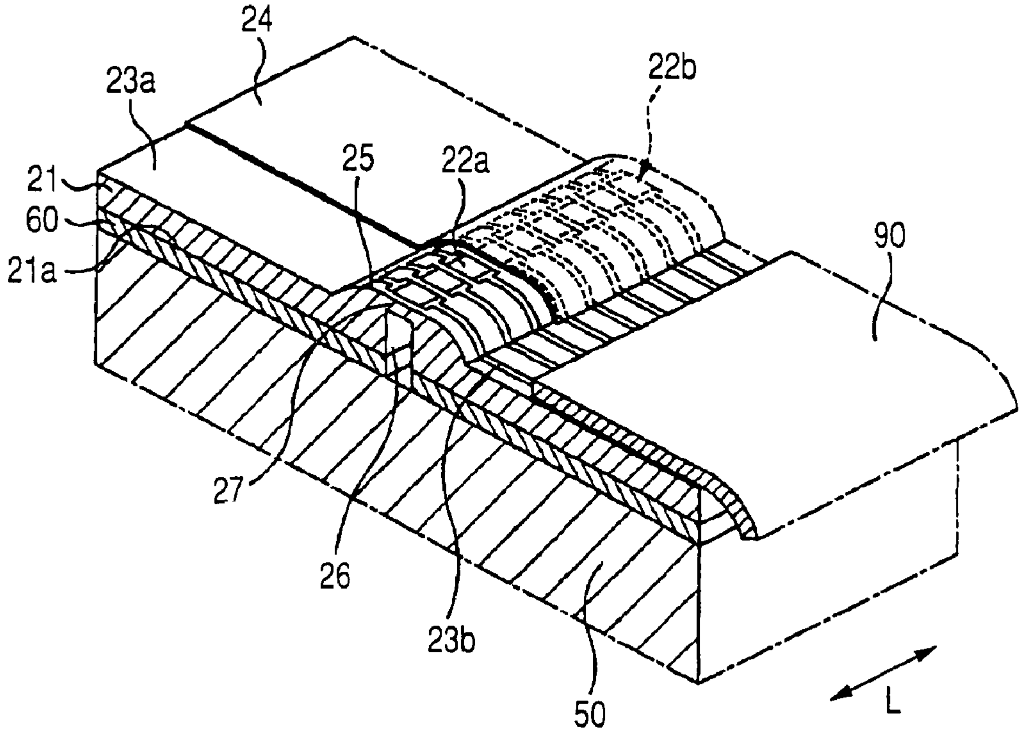
FIG. 8 is a perspective view of the thermal head, showing the vertically-cut internal configuration.
Figure 9:
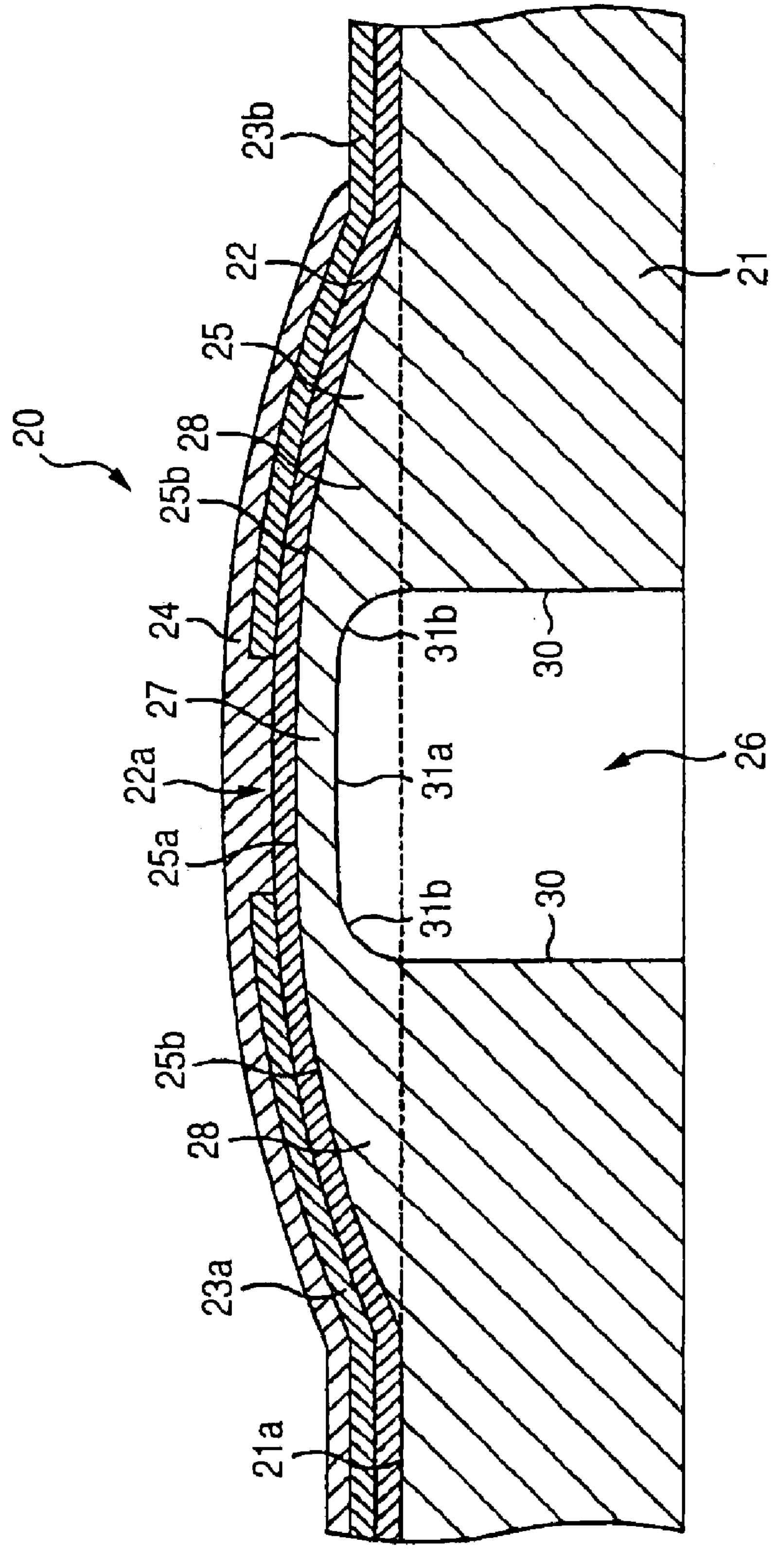
FIG. 9 is a cross sectional view of a head section of the thermal head.

The thermal head 2 is so configured that the length in the direction of an arrow L in FIG. 7 is longer than the width of the printing paper 4. This is aimed to achieve the thermal transfer of a coloring material up to both ends of the printing paper 4 in the width direction. The thermal head 2 is configured by a head section 20 being attached to a heat releasing member 50. The head section 20 is the one taking in charge of thermally transferring the coloring materials of the ink ribbon 3 to the printing paper 4. As shown in FIGS. 8 and 9, this head section 20 is configured to include a glass-made base layer 21, a heating resistor 22 disposed on the base layer 21, a pair of electrodes 23*a* and 23*b* disposed on both sides of the heating resistor 22, and a resistor protection layer 24 disposed on and around the heating resistor 22. In the thermal head 2, a portion of the heating resistor 22 exposing between the electrodes 23*a* and 23*b* serves as a heat-producing portion 22*a*.

The base layer 21 is formed, as a piece, with a substantially-semi-cylindrical protrusion section 25 on one surface 21*a* opposing the ink ribbon 3. The surface 21*a* is made of glass with a softening point of about 500 degrees, for example and formed in substantially rectangular. The side opposite to the protrusion section 25 is provided with a groove section 26 with an open surface, i.e., the surface of the base layer 21 opposite to the surface 21*a*. The base layer 21 is allowed to smoothly abut the running ink ribbon 3 with the protrusion section 25 shaped substantially like a semi cylinder in the length direction, i.e., the direction of an arrow L in FIG. 8, at substantially the center of the base layer 21 in the width direction. Such smooth abutment enables the running ink ribbon 3 to receive the thermal energy without fail so that the coloring material is thermally transferred to the printing paper 4. That is, like a vehicle windshield being slightly curved for better water shedding by a wiper, the protrusion section 25 shaped substantially like a semi cylinder helps the coloring material of the ink ribbon 3 to be transferred to the printing paper 4 with reliability.

The groove section 26 is shaped concave on the inner surface of the base layer 21 to oppose a substantially-linear string 22*b* of the heat-producing portions 22*a* disposed on the protrusion section 25, and forms a cavity in the base layer 21. On the base layer 21, a space, i.e., a thermal storage section 27, between a surface 25*a* of the protrusion section 25 and a ceiling surface 31*a* of the groove section 26 stores therein the thermal energy produced by the heat-producing portions 22*a*.

With the groove section 26 being a cavity inside of the base layer 21, the air inside of the groove section 26 prevents the thermal energy produced by the heat-producing portions 22*a* from being released inside. With the base layer 21 configured as such, the thermal energy is easily directed to the ink ribbon 3 with efficiency. Also with the groove section 26 formed inside of the base layer 21, the thermal storage section 27 is formed thin with the smaller heat capacity so that the heat can be released in a short time. As such, with the smaller heat capacity, the base layer 21 formed with the groove section 26 becomes able to release the heat in a short time so that the thermal head 2 can have the better response, and with the configuration of hardly releasing the heat, the thermal efficiency can be increased so that the thermal head 2 can be energy efficient.

Note here that the base layer 21 may be of a material having any predetermined surface properties, thermal properties, or others, typified by glass. The glass is surely not the only option, and the material may be synthetic gem or man-made stone such as artificial quartz, man-made ruby, or man-made sapphire, or high-density ceramic, for example.

As shown in FIG. 9, the heating resistor 22 is formed on one surface of such a base layer 21. The heating resistor 22 is of a heatproof material being high in resistance, e.g., Ta—N (tantalum nitride) or Ta—$SiO_2$ (tantalum silicon dioxide). The heating resistor 22 is formed with, on the respective sides, a pair of electrodes 23*a* and 23*b*. The electrodes 23*a* and 23*b* provide a current from the power supply to the heat-producing portion 22*a* so that the heat-producing portion 22*a* produces heat. The electrodes 23*a* and 23*b* are each of a material having good electrical conduction such as aluminum, gold, or copper, for example. From the space between the electrodes 23*a* and 23*b*, the heating resistor 22 is exposed, and the space serves as the heat-producing portion 22*a* for application of the thermal energy to the ink ribbon 3. The heat-producing portion 22*a* is formed plurally to be substantially aligned on the protrusion section 25. The heat-producing portions 22*a* are each slightly larger than a dot in size, and are each formed substantially rectangular or square.

Note here that the area to be formed with the heating resistor 22 is not necessarily be entire of the surface 21*a* of the base layer 21 as long as it is larger than the area of the heat-producing portion 22*a*, being enough for an electrical connection with the electrodes 23*a* and 23*b*.

The resistor protection layer 24 disposed at the outermost of the head section 20 covers entirely the heating-resistor 22 and the collective-connection electrode 23*a*, and covers the individual-connection electrode 23*b* on the end portion on the side of the heat-producing portion 22*a*. The resistor protection layer 24 accordingly protects the heat-producing portion

22a and the electrodes 23a and 23b therearound from the friction or others, which are produced when the thermal head 2 comes in contact with the ink ribbon 3. Such a resistance protection layer 24 is made of an inorganic material such as metal having excellent properties under the high temperature, e.g., mechanical properties such as high strength or wear resistance, or thermal properties such as heat resistance, thermal shock resistance, or heat conduction. For example, the resistance protection layer 24 is made of SIALON (product name) including silicon (Si), aluminum (Al), oxygen (O), and nitrogen (N). Alternatively, the same type of layer as the resistance protection layer 24 may be formed to the groove section 26, specifically, to the ceiling surface 31a.

Figure 10:
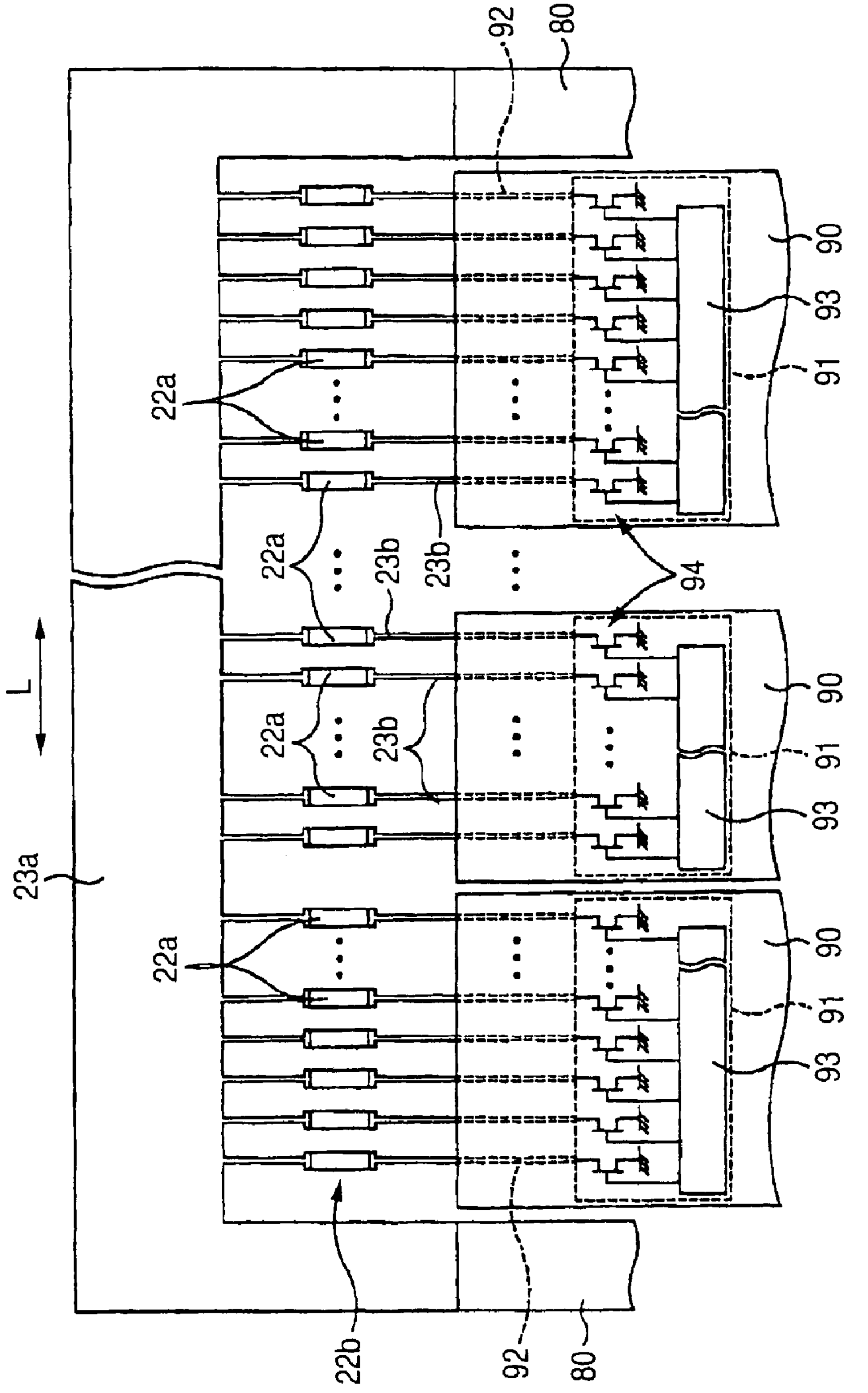
FIG. 10 is a plan view of the head section.

As shown in FIG. 10, as to the electrodes 23a and 23b, the electrode 23a is provided for collective connection, being electrically connected with collectively all of the heat-producing portions 22a, and the electrode 23b is provided for individual connection, being electrically connected with individually each of the heat-producing portions 22a. The electrodes 23a and 23b are both formed on the heating resistor 22 with the heat-producing portion 22a therebetween.

The collective-connection electrode 23a is disposed on the side opposite to the side attached with a flexible substrate 80 (will be described later) for power supply use with the protrusion section 25 of the base layer 21 disposed therebetween. The collective-connection electrode 23a is electrically connected to all of the heat-producing portions 22a. Both ends of the collective-connection electrode 23a are pulled out, along the shorter side of the base layer 21, toward the side attached with the power-supply-use flexible substrate 80 so that an electrical connection is established with the flexible substrate 80. Via the flexible substrate 80, the collective-connection electrode 23a is electrically connected also to a rigid substrate 70, which is being electrically connected to the power supply. As such, the collective-connection electrode 23a serves to establish an electrical connection between the power supply and the heat-producing portions 22a.

The individual-connection electrode 23b is disposed on the side attached with a flexible substrate 90 (will be described later) for signal use with the protrusion section 25 of the base layer 21 disposed therebetween. The individual-connection electrode 23b has a one-to-one relationship with the heat-producing portions 22a. The individual-connection electrode 23b is electrically connected to the signal-use flexible substrate 90, which is connected to a control circuit being in charge of exercising control over the driving of the heat-producing portions 22a of the rigid substrate 70.

The collective-connection electrode 23a and the individual-connection electrode 23b each make a current supply to any of the heat-producing portions 22a for a predetermined length of time. Herein, the heat-producing portion(s) 22a are those selected by the circuit being in charge of exercising control over the driving of the heat-producing portions 22a. Through such a current supply, the coloring material is sublimated, and the heat-producing section(s) 22a are made to produce heat until the temperature reaches a value possible for thermal transfer to the printing paper 4.

Figure 11:
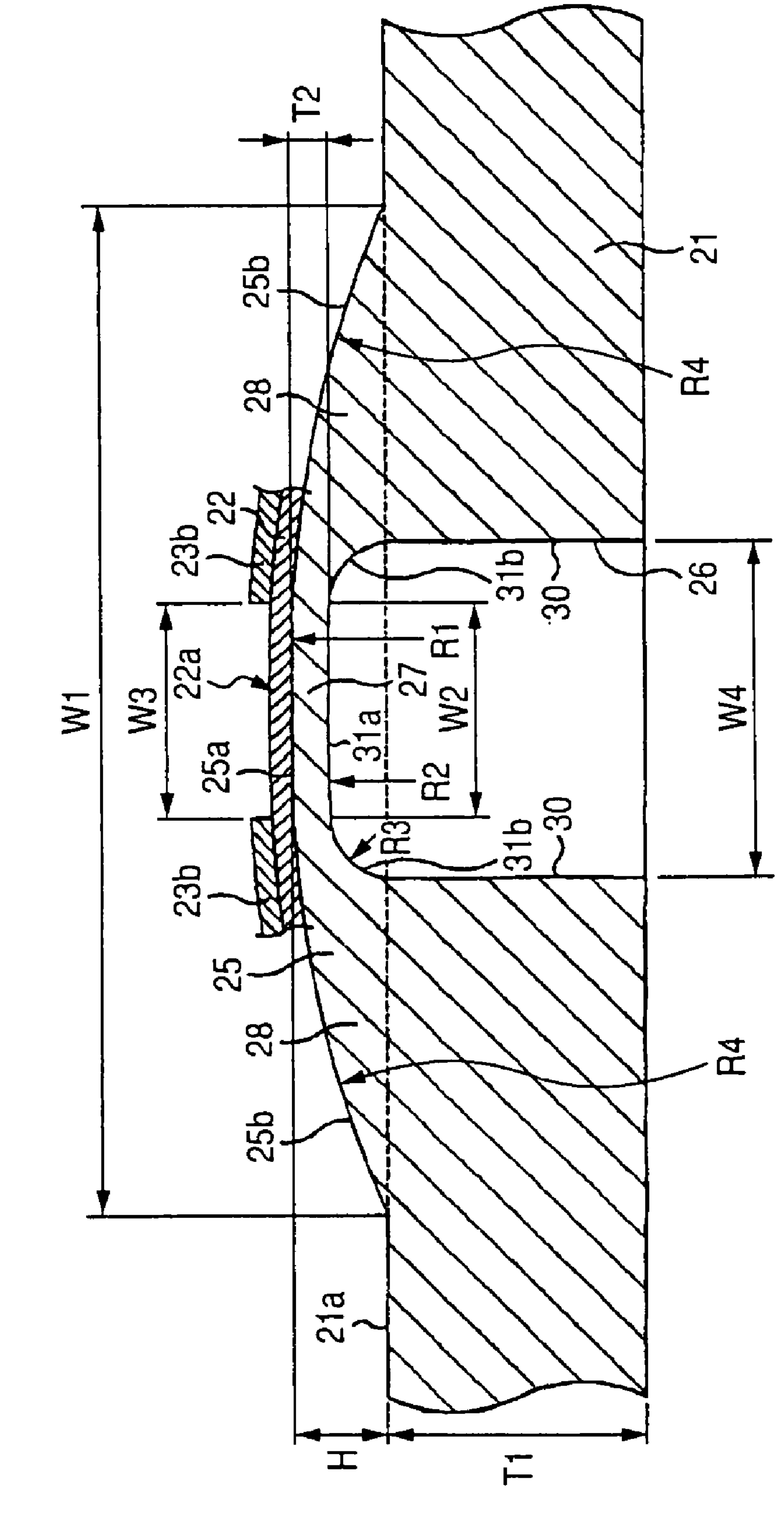
FIG. 11 is a cross sectional view of a base layer of the thermal head.

By referring to FIG. 11, the base layer 21 is described in detail. The base layer 21 has the substantially constant thickness T1 of 0.19 mm, for example. The base layer 21 is formed with, on the surface 21a, the protrusion section 25 with the height H of 0.098 mm, and the width W1 of 0.9 mm, for example.

The groove section 26 of the base layer 21 is formed with such a depth that its ceiling surface 31a comes above the surface 21a of the base layer 21, i.e., comes inside of the semi-cylindrical protrusion section 25. Note that the dotted line in FIG. 11 is an extension of the surface 21a of the base layer 21 in the protrusion section 25. With such a configuration that the ceiling surface 31a of the groove section 26 is located above one surface of the base layer 21, the thermal storage section 27 is made thinner with the smaller thermal storage so that the thermal head 2 is provided with the better response. The thermal storage section 27 here is the one disposed between the surface 25a of the protrusion section 25 and the ceiling surface 31a of the groove section 26. Such a configuration is surely not restrictive, and although the effects are not expected that much as with the above configuration, i.e., the ceiling surface 31a is located inside of the protrusion section 25, the ceiling surface 31a may be located below the protrusion section 25.

In the thermal storage section 27, the surface 25a of the protrusion section 25 is formed like an arc with an extremely gentle slope. The surface 25a of the protrusion section 25 has the radius R1 of 2.5 mm, for example. The ceiling surface 31a of the groove section 26 is also formed like an arc with the slope almost the same as that of the surface 25a of the protrusion section 25. The ceiling surface 31a of the groove section 26 has the radius R2 of 2.4725 mm, for example. As such, in the thermal storage section 27, the surface 25a of the protrusion section 25 and the ceiling surface 31a of the groove section 26 have substantially the same arc surface, and the thickness T2 therebetween is so formed as to be substantially uniform. As an example, the thermal storage section 27 is so formed as to have the thickness T2 of 0.0275 mm. As such, by being formed with the substantially-uniform thickness, the thermal storage section 27 can store therein the thermal energy with uniformity.

As is formed thin for the aim of reducing the thermal storage, the thermal storage section 27 is required to have the physical strength of a level not being broken even if it is pressed by the platen roller 5. As described above, as is substantially uniform in thickness, the thermal storage section 27 is reduced or eliminated in area of causing stress concentration so that the physical strength can be increased. A portion formed by a side wall 30 of the groove section 26 and the ceiling surface 31a, i.e., a corner portion 31b, has a surface curved like an arc. The corner portion 31b is formed by the curved surface with the radius R of 0.03 mm, for example. With the corner portions 31b and 31b of the groove section 26 being formed by the curved surfaces as such, the protrusion section 25 can disperse the pressure applied by the platen roller 5 to a further extent than with the corner portions 31b and 31b those formed square, for example. This thus accordingly increases the physical strength.

The width W2 of the thermal storage section 27 having the substantially uniform thickness T2 is the same as the width W3 of the heat-producing portion 22a, which is an exposed portion of the heating resistor 22 between a pair of electrodes 23a and 23b. To be specific, the width W2 of the thermal storage section 27 is the width between the inner end portions of the curved surfaces of the corner portions 31b and 31b, and the width W2 is set to be the same as the width W3 of the heat-producing portion 22a. Exemplified here is a case where the inner end portions of the curved surfaces of the corner portions 31b and 31b are located at positions with a 0.03 mm from the side walls 30 and 30 of the groove section 26, and the widths W2 and W3 are both 0.2 mm. In this case, the heat-producing portion 22a is positioned on the thermal storage section 27 that substantially-uniformly stores the thermal energy with the substantially uniform thickness. This thus enables uniform application of thermal energy to the ink ribbon 3 from inside of the heat-producing portion 22a. Here, in view of the physical strength or others, the width W1 of the protrusion section 25 (0.9 mm in this example) is preferably three times or more than the width W2 of the thermal storage section 27 with the substantially uniform thickness T2 (0.2 mm in this example).

Alternatively, the width W2 of the thermal storage section 27 with the substantially uniform thickness T2 may be set wider than the width W3 of the heat-producing portion 22*a*. This according reduces the width of the groove section 26 from side to side, i.e., the heat conduction path is narrowed in width, so that the thermal energy stored in the thermal storage section 27 is hardly released to peripheral sections 28 and 28 of the protrusion section 25.

The radius R4 of curved side surfaces 25*b* and 25*b* of the thermal storage section 27 is so formed as to be smaller than the radius R1 of the surface 25*a* of the area formed with the thermal storage section 27 of the protrusion section 25. That is, the curved side surfaces 25*b* and 25*b* of the curved surface 25*a* of the protrusion section 25 are formed steeper than the curved surface 25*a* of the protrusion section 25 formed to the thermal storage section 27. This eases the ink ribbon 3 to enter to or exit from the heat-producing portion 22*a*. With such a configuration of the protrusion section 25, i.e., the radius R4 of the curved side surfaces 25*b* and 25*b* of the thermal storage section 27 is smaller than the radius R1 of the surface 25*a* formed with the thermal storage section 27, i.e., with the steeper curved surface, the groove section 26 is reduced in width from side to side, and the glass can be thinner compared with the reverse case. As a result, the thermal energy stored in the thermal storage section 27 is less prone to transferring to the peripheral sections 28 and 28 of the protrusion section 25.

The side walls 30 and 30 of the groove section 26 are so formed as to stand substantially more vertically than the other surface of the base layer 21, and the width W4 is of a fixed value, i.e., 0.26 mm. With such a groove section 26, compared with the groove section 26 wider in width toward the aperture side, this accordingly eliminates stress concentration to the standing portions of the side walls 30 and 30 even if the protrusion section 25 is pressed by the platen roller 5 so that the physical strength can be increased. Alternatively, when the corner portions 31*b* and 31*b* of the groove section 26 are not curved, i.e., the corner portions are formed square, the width W4 between the side walls 30 and 30 may be set to be the same as the width W2 of the thermal storage section 27.

The specific dimension of the thermal head 2 of FIG. 11 is as follows.

The width W4 of the groove section 26 is the same as or wider than the width W3 of the heat-producing portion 22*a*, e.g., in a range of 0.05 mm to 0.7 mm, preferably, 0.2 mm to 0.7 mm, and more preferably 0.26 mm. The thickness T2 of the thermal storage section 27 is exemplarily in a range of 0.01 mm to 0.1 mm, preferably 0.02 mm to 0.04 mm, and more preferably 0.0275 mm.

Figure 12:
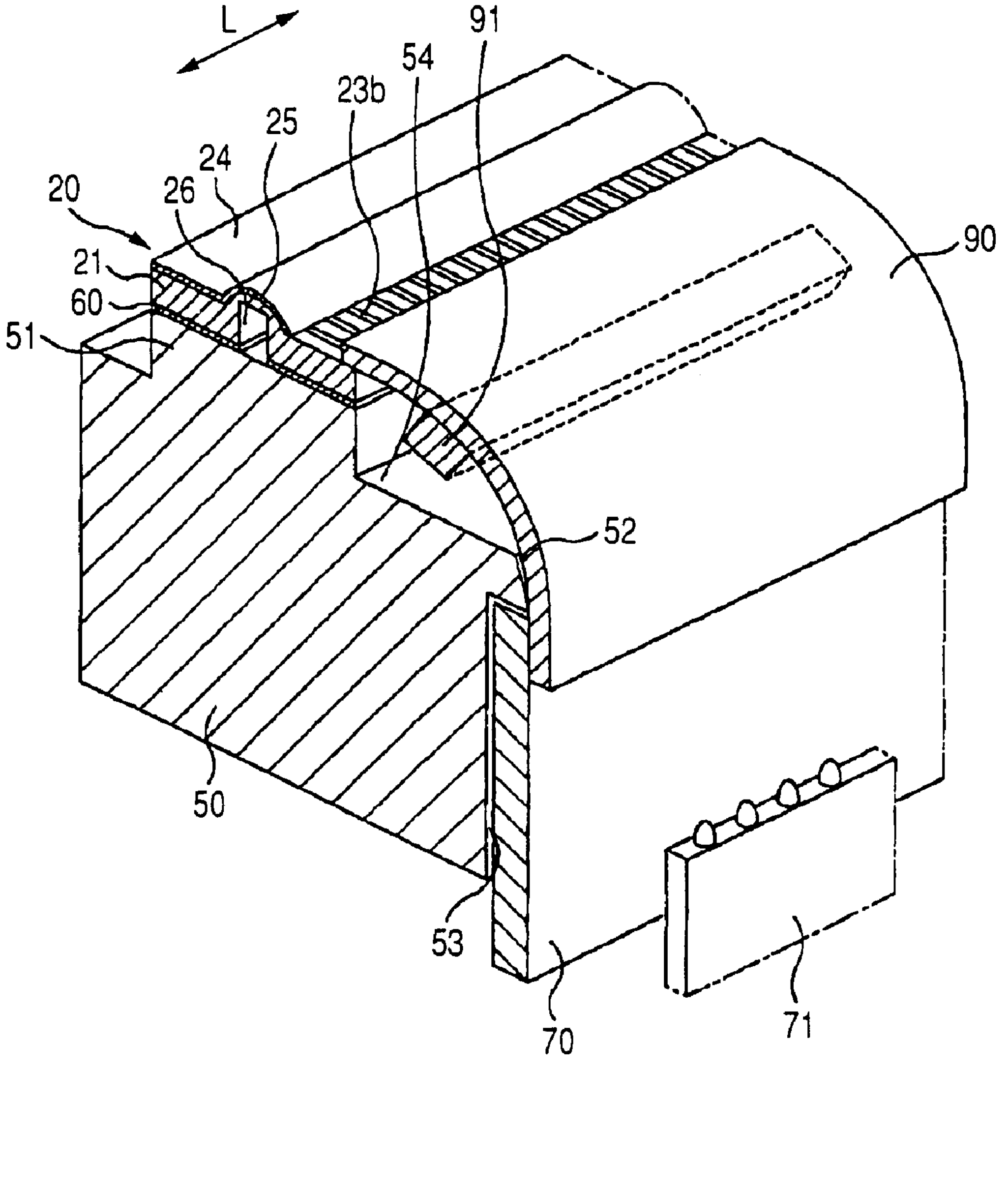
FIG. 12 is a perspective view of the thermal head.

As shown in FIG. 12, in the thermal head 2 having such a head section 20, the head section 20 is disposed on the heat releasing member 50 with an adhesive layer 60 therebetween. The head section 20 and the rigid substrate 70 are electrically connected using the flexible substrate 80 for power supply use and the flexible substrate 90 for signal use. The rigid substrate 70 is the one provided with a control circuit or others of the head section 20. The thermal head 2 is reduced in size by the power-supply-use flexible substrate 80 and the signal-use flexible substrate 90 being curved toward the side of the heat releasing member 50, and the rigid substrate 70 being disposed on the side surface of the heat releasing member 50.

The heat releasing member 50 serves to release the thermal energy produced by the head section 20 when the coloring material is thermally transferred. The heat releasing member 50 is made of a material high in thermal conductivity, e.g., aluminum. This heat releasing member 50 is formed with an attachment protrusion section 51 at substantially the center on the upper surface in the width direction for use to attach the head section 20 along the length direction, i.e., the direction of an arrow L in FIG. 12. The heat releasing member 50 is also formed with a taper section 52 at the upper end of the surface on the side where the power-supply-use flexible substrate 80 and the signal-use flexible substrate 90 are curved. The taper section 52 is used to have curved the power-supply-use flexible substrate 80 and the signal-use flexible substrate 90. The taper section 52 is formed with, at the lower end, a first notch section 53 for use to place the rigid substrate 70 on the side surface. The heat releasing member 50 is formed with a second notch section 54 for use to place a semiconductor chip 91 on the side of the heat releasing member 50. The semiconductor chip 91 is the one provided to the signal-use flexible substrate 90, and will be described later.

The rigid substrate 70 is provided with a wiring pattern for use to make a current supply from the power supply to the head section 20. The rigid substrate 70 is also provided with a control circuit for exercising control over the driving of the head section 20, which is incorporated with a plurality of electrical components. The rigid substrate 70 is electrically connected with a flexible substrate 71 serving as a power supply line, a signal line, or others. The rigid substrate 70 is disposed to the first notch section 53 on the side surface of the heat releasing member 50, and is fixed to the heat releasing member 50, at both ends, using a fixation member 72 such as screw.

The power-supply-use flexible substrate 80 for an electrical connection with the rigid substrate 70 is electrically connected with, at one end, the wiring pattern of the rigid substrate 70 for power supply use, and is connected with, at the other end, the collective-connection electrode 23*a* of the head section 2.0. With such a configuration, an electrical connection is established between the collective-connection electrode 23*a* of the head section 20 and the wiring pattern of the rigid substrate 70, and a current supply is made to the heat-producing portions 22*a*.

The signal-use flexible substrate 90 to be electrically connected with the control circuit of the rigid substrate 70 is electrically connected, at one end, to the control circuit of the rigid substrate 70, and at the other end, to the individual electrode 23*b* of the head section 20.

The signal-use flexible substrate 90 is provided with, on one surface, the semiconductor chip 91, and on the side of the same surface connected to the head section 20, a connection terminal 92 is provided. The semiconductor chip 91 is the one including a drive circuit for use to drive the heat-producing portions 22*a* of the head section 20, and the connection terminal 92 is used to electrically connect together the semiconductor chip 91 and the individual-connection electrodes 23*b*.

The semiconductor chip 91 disposed to the signal-use flexible substrate 90 is placed inside of the signal-use flexible substrate 90.

The semiconductor chip 91 includes a shift register 93 and a switching element 94. The shift register 93 serves to convert a serial signal into a parallel signal, and the switching element 94 serves to exercise control over the driving of the heat-producing portions 22*a* for heat production. The serial signal here is the one corresponding to printing data coming from the control circuit of the rigid substrate 70. After converting the serial signal corresponding to the printing data to the parallel signal, the shift register 93 latches the resulting parallel signal. The switching element 94 is provided to each of the individual-connection electrodes 23*b* of the heat-producing portions 22*a*. The parallel signal latched by the shift register 93 exercises control over the heat-producing portions 22*a* in terms of the current supply, the supply time, and others through on-off control over the switching element 94 so that the heat-producing portions 22*a* are drive-controlled for heat production.

As described in the foregoing, in the thermal head 2, the electrical connection points can be reduced in number with the semiconductor chip 91 enabling serial transmission between the rigid substrate 70 and the signal-use flexible substrate 90. This is because the semiconductor chip 91 is including the shift register 93 on the signal-use flexible substrate 90 for converting a serial signal into a parallel signal. The signal-use flexible substrate 90 is used to electrically connect the individual-connection electrode 23*b* of the head section 20 together with the control circuit of the rigid substrate 70.

In the thermal head 2 of such a configuration, the semiconductor chip 91 is so disposed as to oppose the second notch section 54 of the heat releasing member 50. The components, i.e., the power-supply-use flexible substrate 80 and the signal-use flexible substrate 90, are curved along the taper section 52 of the heat releasing member 50 in such a manner that the semiconductor chip 91 comes inside. As such, the rigid substrate 70 is disposed to the first notch section 53 of the heat releasing member 50. As such, the thermal head 2 can be favorably reduced in size by the rigid substrate 70 being disposed on the side surface of the heat releasing member 50 so that the printer device 1 can be reduced in size in its entirety. The resulting thermal head 2 accordingly meets the demand for size reduction of the printer device 1, especially printer devices for home use. What is more, as is including the head section 20 simply disposed on the heat releasing member 50 via the adhesive layer 60, the thermal head 2 is simplified in configuration. The thermal head 2 can be thus manufactured with ease, thereby enhancing the production efficiency. In such a size-reduced thermal head 2 with the semiconductor chip 91 disposed inside, and the rigid substrate 70 disposed on the side surface of the heat releasing member 50, the ribbon guide 6*a* can be disposed in the close range on the side from which the printing paper 4 enters. In the printer device 1 using such a thermal head 2, the ink ribbon 3 and the printing paper 4 can be guided until immediately before-entering between the thermal head 2 and the platen roller 5 so that the ink ribbon 3 and the printing paper 4 can be appropriately directed between the thermal head 2 and the platen roller 5. In such a printer device 1 allowing the ink ribbon 3 and the printing paper 4 to be directed appropriately between the thermal head 2 and the platen roller 5, the ink ribbon 3 and the printing paper 4 vertically, substantially, abut the thermal head 2 so that the thermal energy of the thermal head 2 can be appropriately applied to the ink ribbon 3.

With the printer device 1 using such a thermal head 2, for printing of images and characters, the ink ribbon 3 and the printing paper 4 are both made to run between the thermal head 2 and the platen roller 5 while being pressed against the thermal head 2 by the platen roller 5. To the printing paper 4 running between the thermal head 2 and the platen roller 5 as such, the coloring materials of the ink ribbon 3 are thermally transferred. For thermally transferring the coloring materials, the following procedure is executed. That is, a serial signal corresponding to printing data provided to the control circuit of the rigid substrate 70 is converted into a parallel signal in the shift register 93 of the semiconductor chip 91 provided to the signal-use flexible substrate 90. The resulting parallel signal is latched, and thus latched parallel signal is used to exercise on-off control over the switching element 94 provided for each of the individual-connection electrodes 23*b*. In the thermal head 2, when any of the switching elements 94 is turned on, a current starts flowing to the heat-producing portion 22*a* connected to the switching element 94 for a predetermined length of time so that the heat-producing portion 22*a* produces heat. The resulting thermal energy is then applied to the ink ribbon 3 so that the coloring material is sublimated for thermal transfer to the printing paper 4. When any of the switching elements 94 is turned off, a current stops flowing to the heat-producing portion 22*a* connected to the switching element 94 so that the heat-producing portion 22*a* produces no heat. No thermal energy is thus applied to the ink ribbon 3 so that the coloring material is not thermally transferred to the printing paper 4. In the printer device 1, such a procedure is repeated in response to a serial signal, for every line of the printing data, coming from the semiconductor chip 91 of the signal-use flexible substrate 90 from the control circuit of the thermal head 2 so that the color of yellow is thermally transferred to an image formation section. After the thermal transfer is completed for the color of yellow, similarly, the image formation section is sequentially subjected to the thermal transfer, i.e., the color of magenta, the color of cyan, and a laminating film, so that an image is printed.

For thermally transferring the coloring materials of the ink ribbon 3 as such, in the thermal head 2, the groove 26 formed to the base layer 21 of the head section 20 helps the efficient application of the thermal energy to the ink ribbon 3. This is because the air in the groove section 26 prevents the thermal energy produced in the heat-producing portions 22*a* from being released inside. On the other hand, with the base layer 21 formed with the groove section 26 as such, the thermal storage section 27 is formed thin with the smaller heat capacity so that the heat can be released in a short time. As such, with the smaller thermal storage, the base layer 21 formed with the groove section 26 becomes capable of heat release in a short time, thereby leading to the better response of the thermal head 2. The base layer 21 is also of the configuration of hardly releasing the heat, the thermal efficiency can be increased, and thus the thermal head 2 can be energy efficient. Also with the configuration of the thermal head 2, i.e., the head section 20 is configured by the base layer 21 being formed with the heating resistor 22, a pair of electrodes 23*a* and 23*b*, or others all in a piece, and the head section 20 is attached to the heat releasing member 50 via the adhesive layer 60, the configuration of the thermal head 2 can be simplified in its entirety, and the production efficiency can be enhanced. What is more, using the power-supply-use flexible substrate 80 and the signal-use flexible substrate 90, in the thermal head 2, the rigid substrate 70 is disposed on the side surface of the heat releasing member 50, and the head section 20 and the rigid substrate 70 are electrically connected. This favorably contributes to the size reduction of the thermal head 2, and to the entire size reduction of the printer device 1.

Note here that exemplified above is the case of printing a post card using the printer device 1 for home use, however, the thermal head 2 is not restrictive for use with the printer device 1 for home use, and is surely applicable to any printer device for office use. The printing material is not specifically restricted in size, and together with the post card, photographic paper of L size, plain paper, or others are surely applicable. With this being the case, the high-speed printing is also possible.

Figure 13:
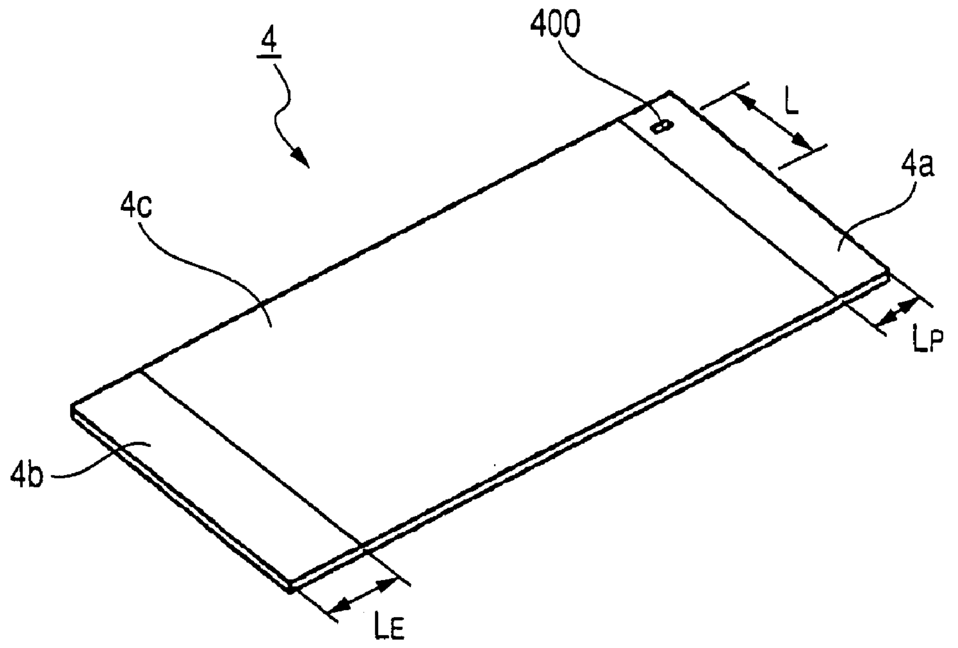
FIG. 13 is a perspective view of a printing paper in the printer device.

In the printer device 1 of such a configuration, as exemplarily shown in FIG. 13, the printing paper 4 housed on the printing paper tray 45 has margin portions 4*a* and 4*b* at both end portions in the paper feed/eject direction with a printing portion 4*c* disposed therebetween. The margin portions 4*a* and 4*b* each have a different length, i.e., LP and LE. The margin portion 4*a* on the front side is formed with an aperture 400 with a displacement, i.e., a distance L, from the center.

Using the aperture 400 formed as such with a displacement from the center of the printing paper 4 eases to define the paper by orientation and side.

Figure 14:
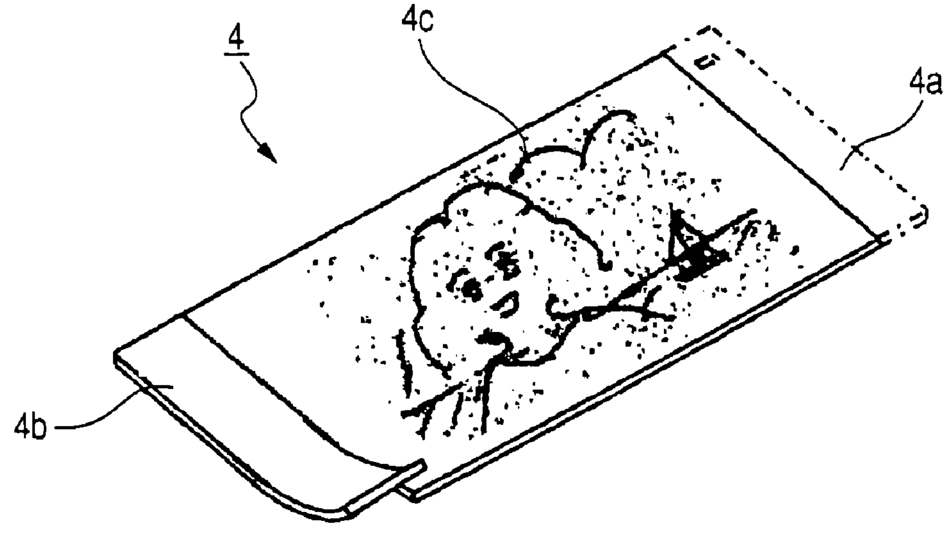
FIG. 14 is a schematic perspective view of an image-printed printing paper showing the state that margin portions are to be cut.

As shown in FIG. 14, after the printing paper 4 is printed with an image, the margin portions 4*a* and 4*b* are cut off by a user, and only the printing portion 4*c* is put into storage.

Figure 15:
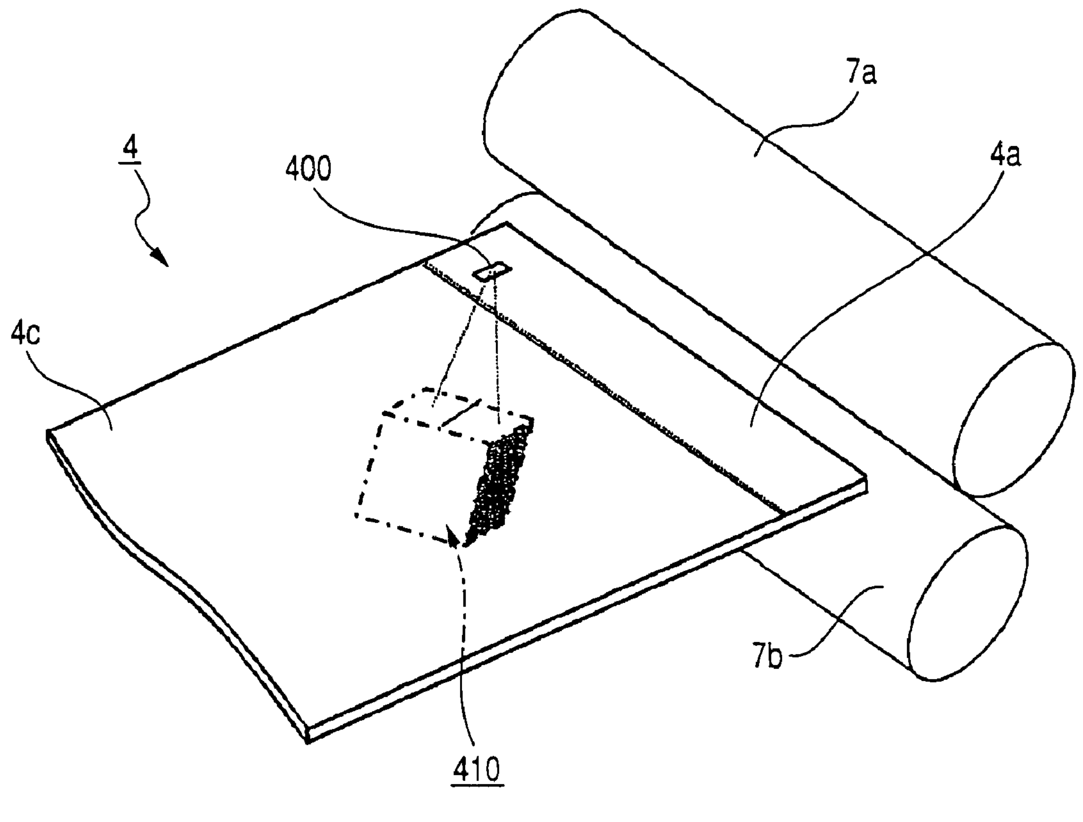
FIG. 15 is a perspective view showing the configuration of detecting an aperture formed to the margin portion of the printing paper.

As exemplarily shown in FIG. 15, the aperture 400 formed to the margin portion 4*a* of the printing paper 4 is detected by a reflective sensor 410. The reflective sensor 410 is disposed in the front of the pinch roller 7*a* and the capstan roller 7*b*, which are in charge of transferring the printing paper 4.

To be specific, for the aim of detecting the aperture 400 with accuracy, the reflective sensor 410 is desirably placed where a paper running path is restricted, and the distance is stable between the reflective sensor 410 and the printing paper 4. In this example, the aperture 400 is assumed as being one, and a sensor takes charge of detecting the presence or absence of the paper and the edge thereof.

That is, the printing operation is executed by the following procedure, i.e., a to g.

a. The printing paper 4 is directed to a mechanism driving section by the paper feed/eject roller 9;

b. the printing paper 4 goes over the reflective sensor 410, and is sandwiched between the pinch roller 7*a* and the capstan roller 7*b;* c. the printing paper 4 is transferred to the paper feed direction by the driving force of the capstan roller 7*b* until the reflective sensor 410 detects the end edge;

d. when the reflective sensor 410 detects the end edge, the platen roller 5 is crimped to the thermal head 2, and the printing paper is transferred to the paper ejection direction for image formation at a predetermined position, i.e. yellow printing;

e. when the yellow printing is completed, the crimp is released between the platen roller 5 and the thermal head 2, and the printing paper 4 is put back to the paper feed direction;

f. the printing paper 4 is transferred again to the paper ejection direction for image formation at a predetermined position, i.e., magenta printing; and g. cyan printing and laminating printing are both executed in a similar manner, and after completion, the printing paper 4 is ejected in the paper ejection direction.

Considered here is a case where the printing paper 4 formed with the aperture 400 at a predetermined position is correctly set on the printing paper tray 45. In such a case, in the above operation state of b, the reflective sensor 410 detects the paper as being present, as being absent (aperture portion), and then as being present. Based on the detection output coming from the reflective sensor 410 as such, a control section 183 (will be described later) determines whether or not to continue the image printing operation. That is, when the detection output tells that the aperture 400 is not detected or the detected waveform is considerably different from the expected waveform, the control section 183 determines that the printing paper 4 is under abnormal conditions, and thus takes care of error handling.

The aperture 400 is not necessarily shaped square, and if with the directional-shape aperture 400 like a triangle, a user can use the aperture as a guide when setting the paper onto the printing paper tray 45.

Described next is the electrical configuration of the above printer device 1.

Figure 16:
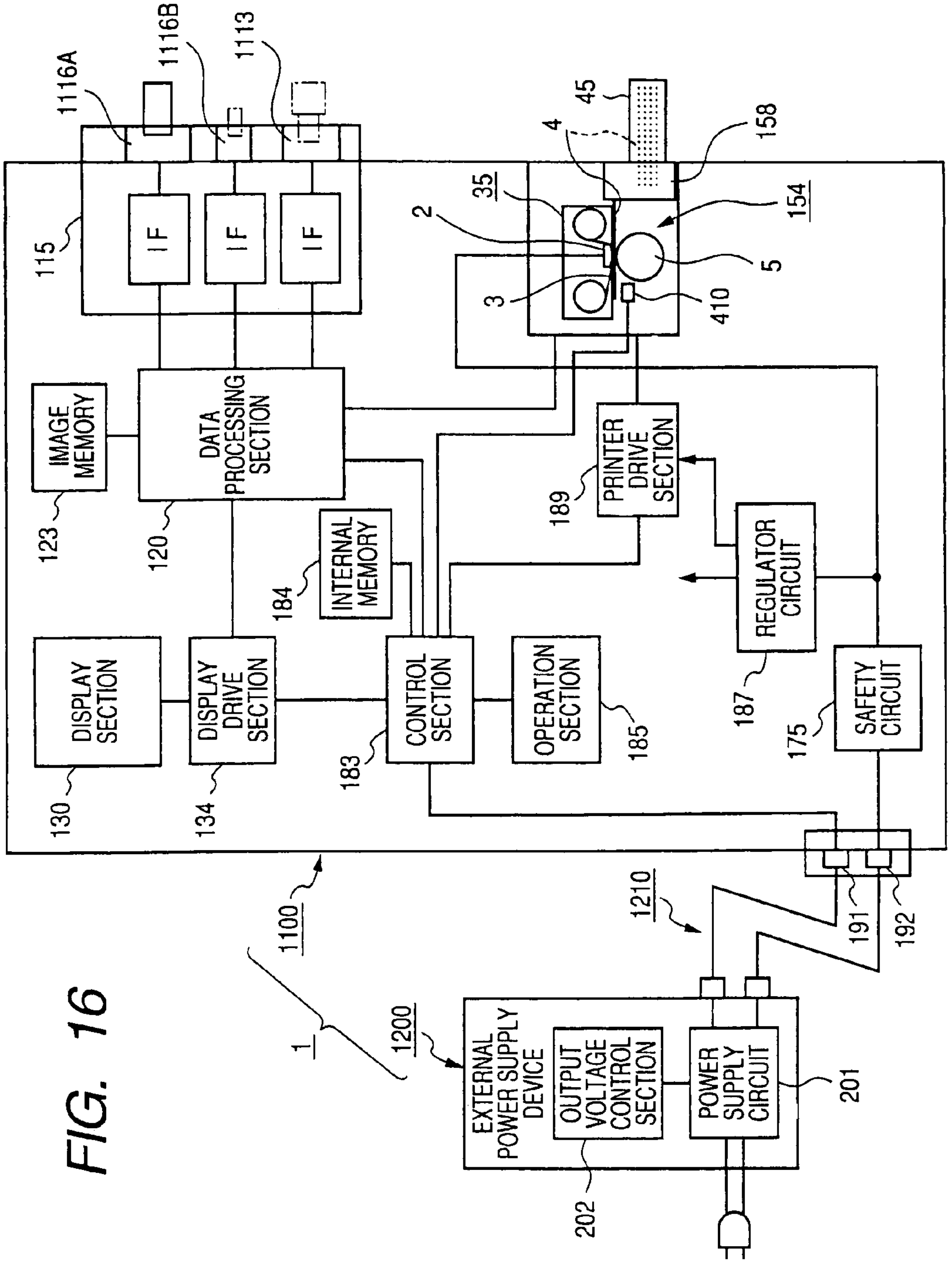
FIG. 16 is a block diagram showing the electrical configuration of the printer device.

As shown in FIG. 16, the printer device body 1100 of the printer device 1 is provided with a multimedia interface section 115, a data processing section 120, an image memory 123, a display section 130, a printing processing section 154, the control section 183, a display drive section 134, an internal memory 184, an operation section 185, a printer drive section 189, and others. The multimedia interface section 115 includes various types of interfaces (I/Fs) for connection with the slots 1116A and 1116B for use with various types of recording media and an USB slot 1113. The data processing section 120 receives image data via the multimedia interface section 115, and the image memory 123 is connected to the data processing section 120. The control section 183 exercises control over the other components in terms of operation, and the display drive section 135 is connected to the control section 183.

In the printer device 1, the control section 183 exercises control over the printing processing section 154 to make it perform the printing process with respect to the correctly-provided printing paper 4. Before such control application, the control section 183 determines whether the printing paper 4 is correctly provided to the printing processing section 154 by the paper feed/eject section 158. This determination is made based on the detection result derived by the reflective sensor 410, which is provided for detecting the aperture 400 formed to the margin portion 4*a* of the printing paper 4 provided to the printing processing section 154 by the paper feed/eject section 158. Herein, the control section 183 is the one exercising control over the operations of the components, i.e., the data processing section 120 in charge of data processing for generating printing data, the printing processing section 154 that prints an image(s) to the printing paper based on the printing data coming from the data processing section 120, the paper feed/eject section 158 configured by the paper feed/eject roller or others for feeding the printing paper 4 to the printing processing section 154 and ejecting the printing paper 4 through with image printing by the printing processing section 154.

The printer device body 1100 is provided with a control signal output terminal 191 and a power supply input terminal 192. To the control signal output terminal 191 and the power supply input terminal 192, the external power supply device 1200 is connected via the power supply cable 1210.

In the printer device 1, the external power supply device 1200 makes a supply of driving power via the power supply input terminal 192. The driving power is captured inside of the device body 1100 via a safety circuit 175. The driving power is then directly supplied to the thermal head 2 of the printing processing section 154, but is supplied to the remaining components after stabilized by a regulator circuit 187.

The control section 183 serves as control signal generation means depending on the operation state of the printer device body 100, i.e., generating a control signal for variable control over the power supply voltage. The control section 183 generates a control signal suiting the operation state, supplies thus generated control signal to the external power supply device 1200 from the control signal output terminal 191 via the power supply cable 1210, and exercises control over the operation of the external power supply device 1200 using the control signal.

The external power supply device 1200 of the printer device 1 is a so-called AC (Alternating Current) adapter, converting an AC power supply to a DC (Direct Current) power supply before output. The external power supply device 1200 is configured by a power supply circuit 201 and an output voltage control section 202. The power supply circuit 201 is the one that converts an AC power supply to a DC power supply, and the output voltage control section 202 is the one that puts, under variable control, the DC power supply voltage coming from the power supply circuit. Using a control signal provided by the control section 183 provided to the printer device body 1100, the supply of a power supply voltage coming from the power supply circuit 201 to the printer device body 1100 is put under variable control by the output voltage control section 202. Such control is applied in accordance with the operation state of the printer device body 1100.

In the printer device 1, the control section 183 provided to the printer device body 1100 generates a control signal for variable control over the power supply voltage in accordance with the performance characteristics of the thermal head 2 of the printing processing section 154. In accordance also with the performance characteristics of the thermal head 2, the control section 183 puts, under variable control, the power supply voltage for supply to the printer device body 1100 from the external power supply device 1200. This enables to correct any concentration change caused by the varying average resistance value of the thermal head 2.

Figure 17:
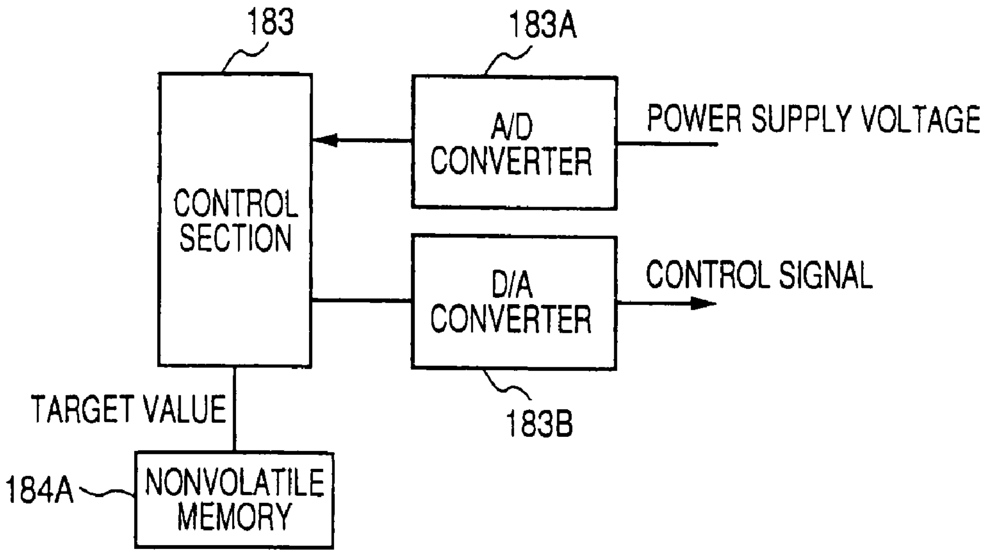
FIG. 17 is a block diagram showing the configuration of generating a control signal for variable control over a power supply voltage in accordance with the operation characteristics of the printer device body in the printer device for each of the printing colors using the thermal head.

Considering the fact that, for color printing, the coloring materials of an ink ribbon each have different relationship between the transfer characteristics and the heating value of the thermal head 2, an alternative configuration is possible as below. That is, for each of colors of yellow (Y), magenta (M), and cyan (C), the relationship is measured in advance between the transfer characteristics and the heating value. A target voltage value needed to derive the heating value of a target level is then stored in a nonvolatile memory 184A for each of the colors. Using the output voltage control section 202, as shown in FIG. 17, the control section 183 provided to the printer device body 1100 puts, under variable control, the power supply voltage for supply to the printer device body 1100 from the power supply circuit 201 of the external power supply device 1200 by monitoring the DC power supply voltage, generating a control signal, and making a supply of thus generated control signal. More in detail, the control section 183 captures, for monitoring, the DC power supply voltage directed from the power supply circuit 201 of the external power supply device 1200 to the power supply input terminal 192 via an A/D (Analog-to-Digital) converter 183A. The control section 183 then generates a control signal with which the DC power supply voltage provided to the power supply input terminal 192 serves as a target voltage value stored in the nonvolatile memory 184A for each of the colors. The control section 183 then supplies thus generated control signal to the output voltage control section 202 of the external power supply device 1200 from the control signal output terminal 191 via a D/A (Digital-to-Analog) converter 183B.

This thus enables, in the printing process, to supply the power supply voltage of an appropriate level, for each of the colors of yellow (Y), magenta (M), and cyan (C), from the power supply circuit 201 of the external power supply device 1200 to the printer device body 1100.

With the printer device 1 of such a configuration, in accordance with the operation state of the printer device body 1100, a control signal coming from the control section 183 provided to the printer device body 1100 is used as a basis for variable control by the output voltage control section 202 over the power supply voltage for supply to the printer device body 1100 from the power supply circuit 201 of the external power supply device 1200. This favorably eliminates the need for including the power supply circuit 201 and the output voltage control section 202 in the printer device body 1100 so that the printer device body 1100 is prevented from being increased in size and cost.

Figure 18:
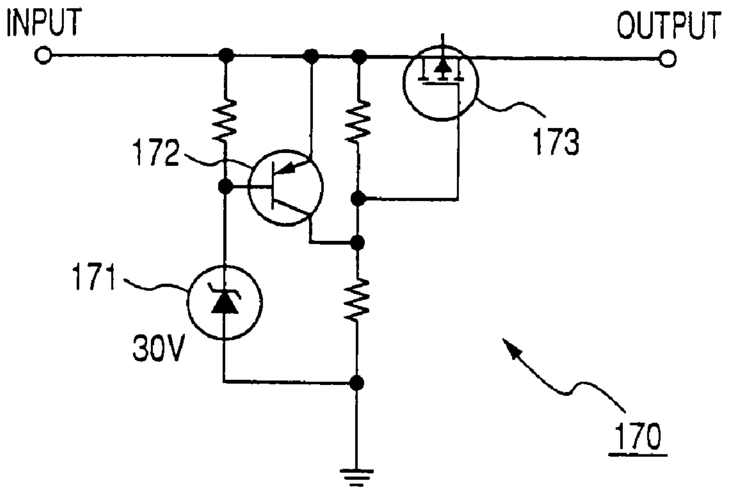
FIG. 18 is a circuit diagram showing an exemplary configuration of a safety circuit provided in the printer device body.

The safety circuit 175 provided to the printer device body 1100 is for protecting the printer device body 1100 from a voltage of a predetermined level, e.g., a power supply voltage of 30V or higher, coming from the power supply circuit 201 of the external power supply device 1200. As shown in FIG. 18, for example, an over voltage control circuit is configured by a zener diode 171, a PNP transistor 172, a MOS (Metal Oxide Semiconductor) transistor switch 173, and others. In the overvoltage control circuit, the MOS transistor switch 173 is turned off when the power supply voltage coming from the power supply circuit 201 of the external power supply device 1200 to the printer device body 1100 reaches 30V or higher.

The control section 183 provided to the printer device body 1100 receives two types of detection output, i.e., one detection output is of detection switch(es) 164 protruding from the cartridge support unit 160, and the other detection output is of a switch 36 serving as lid open/close detection means. The lid open/close means detects that the components, i.e., a top chassis 102, the top plate 1106, and the ink ribbon cartridge holder 1107, are rotated downward, i.e., the direction of closing a base chassis 101, and then retained by the top chassis 102 being latched to the base chassis 101.

As such, the switch 36 serves as the lid open/close means for detecting that the top plate 1106 is rotated down to the printing position where the ink ribbon 3 of the ink ribbon cartridge 35 is opposing the thermal head 2. The detection switch (es) 164 serve as cartridge detection means for detecting whether or not the ink ribbon cartridge 35 is attached to the ink ribbon cartridge holder 1107.

Figure 19:
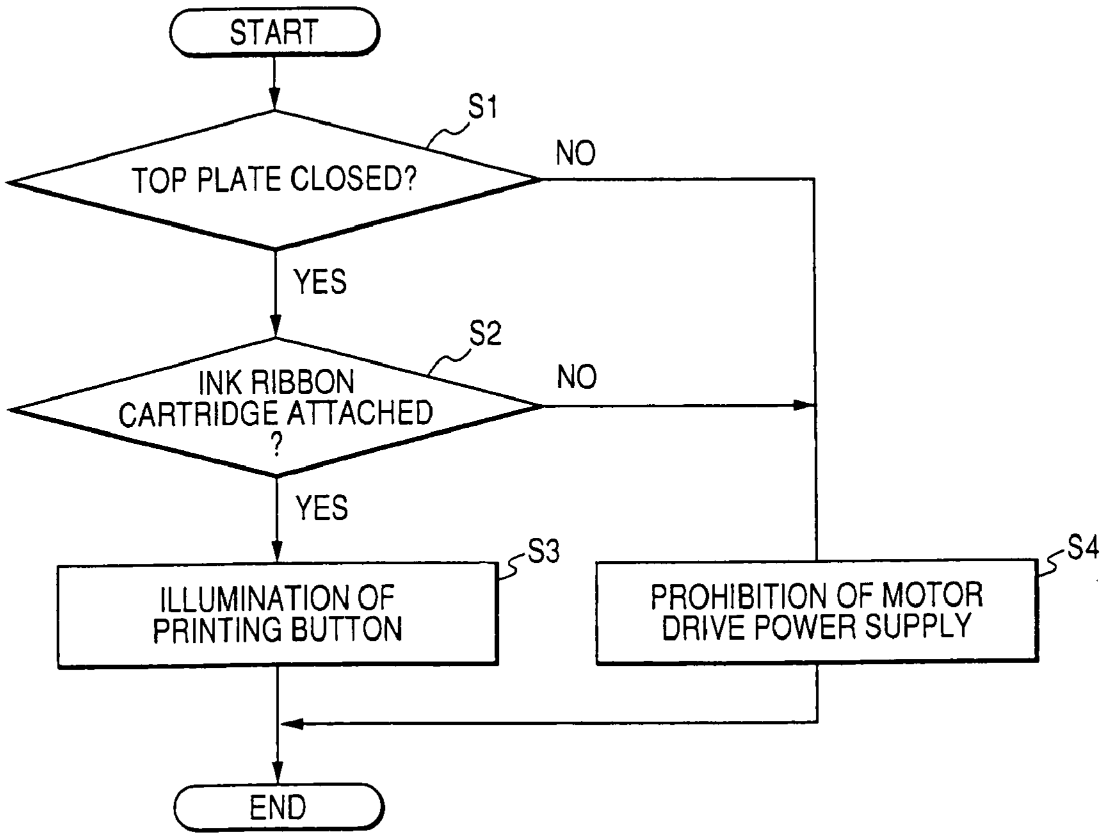
FIG. 19 is a flowchart showing the control operation of a control section provided in the printer device body.

Based on the detection outputs provided by the switches 36 and 164 as such, the control section 183 exercises control over the operation of the printer device 1 by following the procedure of the flowchart of FIG. 19.

That is, the control section 183 determines whether the switch 36 serving as the lid open/close means is being turned ON or not (step S1). When the determination result is YES, i.e., when the top plate 1106 is rotated down to the printing position where the ink ribbon 3 of the ink ribbon cartridge 35 is opposing the thermal head 2, the control section 183 determines whether the detection switch(es) 164 serving as the cartridge detection means are being turned ON or not (step S2).

When the determination result in step S2 is YES, i.e., when the ink ribbon cartridge holder 1107 is attached with the ink ribbon cartridge 35, the control section 183 turns on a printing button 1104A (step S3). With the printing button 1104 turned on as such, the control section 183 accepts a printing start command, i.e., depression of the printing button 1104A, so that the printing operation is started.

When the determination result in step S1 is NO, i.e., when the top plate 1106 is not rotated downward, the supply of a motor power is prohibited (step S4).

When the determination result in step S2 is NO, i.e., when the ink ribbon cartridge 35 is not attached to the ink ribbon cartridge holder 1107, the supply of the motor power is also prohibited (step S4).

Figure 20:
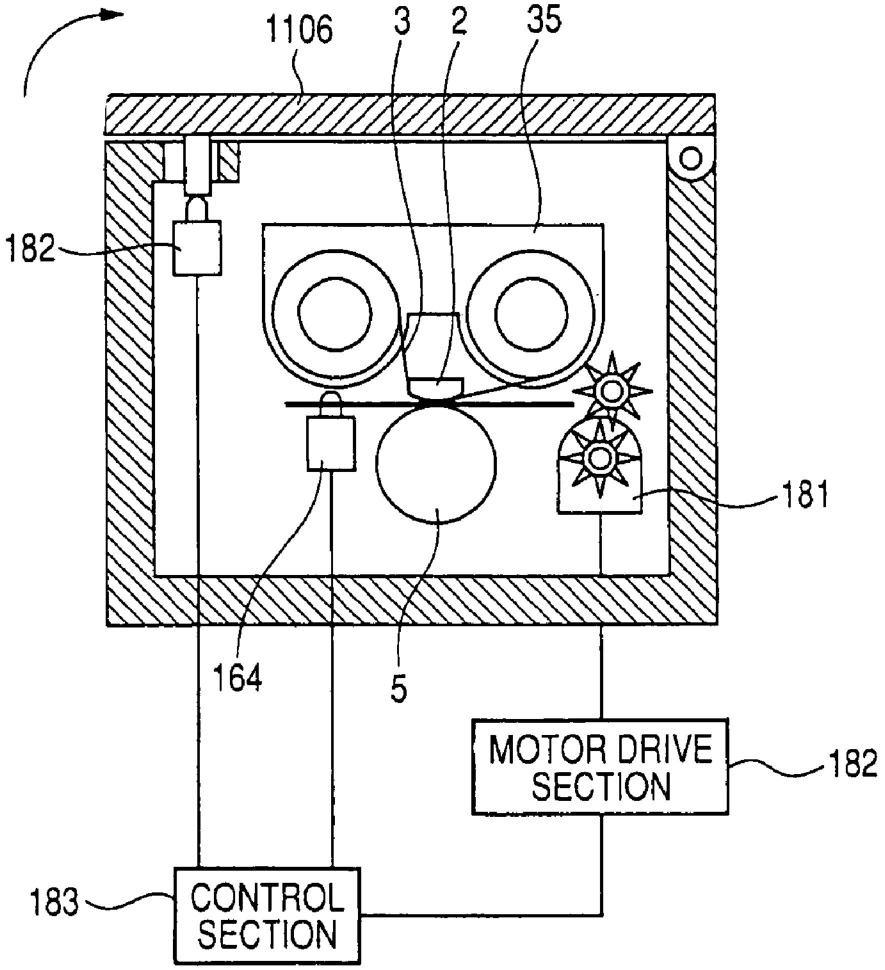
FIG. 20 is a schematic circuit diagram showing the configuration of implementing the protection capability of the control section provided in the printer device body.

That is, in this printer device 1, as shown in FIG. 20, the control section 183 exercises drive control over the printer device body 1100 to operate by making a power supply to a motor drive section 182. Such a power supply is made only when the top plate 1106 is rotated down to the printing position where the ink ribbon 3 of the ink ribbon cartridge 35 is opposing the thermal head 2 in the state that the ink ribbon cartridge holder 1107 is attached with the ink ribbon cartridge 35. The determination whether or not to make such a power supply is made based on the detection output from the switch 36 serving as the lid open/close detection means, and the detection output from the detection switch(es) 164 serving as the cartridge detection means. The motor drive section 182 is the one making a supply of driving current to a switch/running motor and a capstan motor.

Such a printer device 1 including a pop-up mechanism for cartridge insertion is of a configuration that the mechanism section is operated only when the lid open/close means and the cartridge detection means are turned ON at the same time, thereby providing protection with more safety.

Figure 21:
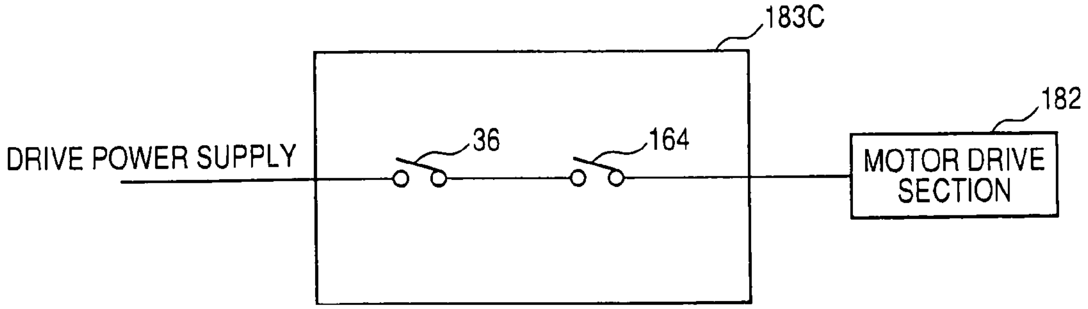
FIG. 21 is a circuit diagram showing an exemplary circuit for implementing the protection capability.

As shown in FIG. 21, the control section 183 can function similarly also in the following configuration. That is, the control section 183 may make a power supply to the motor drive section 182 via a series connection circuit 183C for the switch 36 serving as the lid open/close detection means and the detection switch(es) 164 serving as the cartridge detection means.

Figure 22:
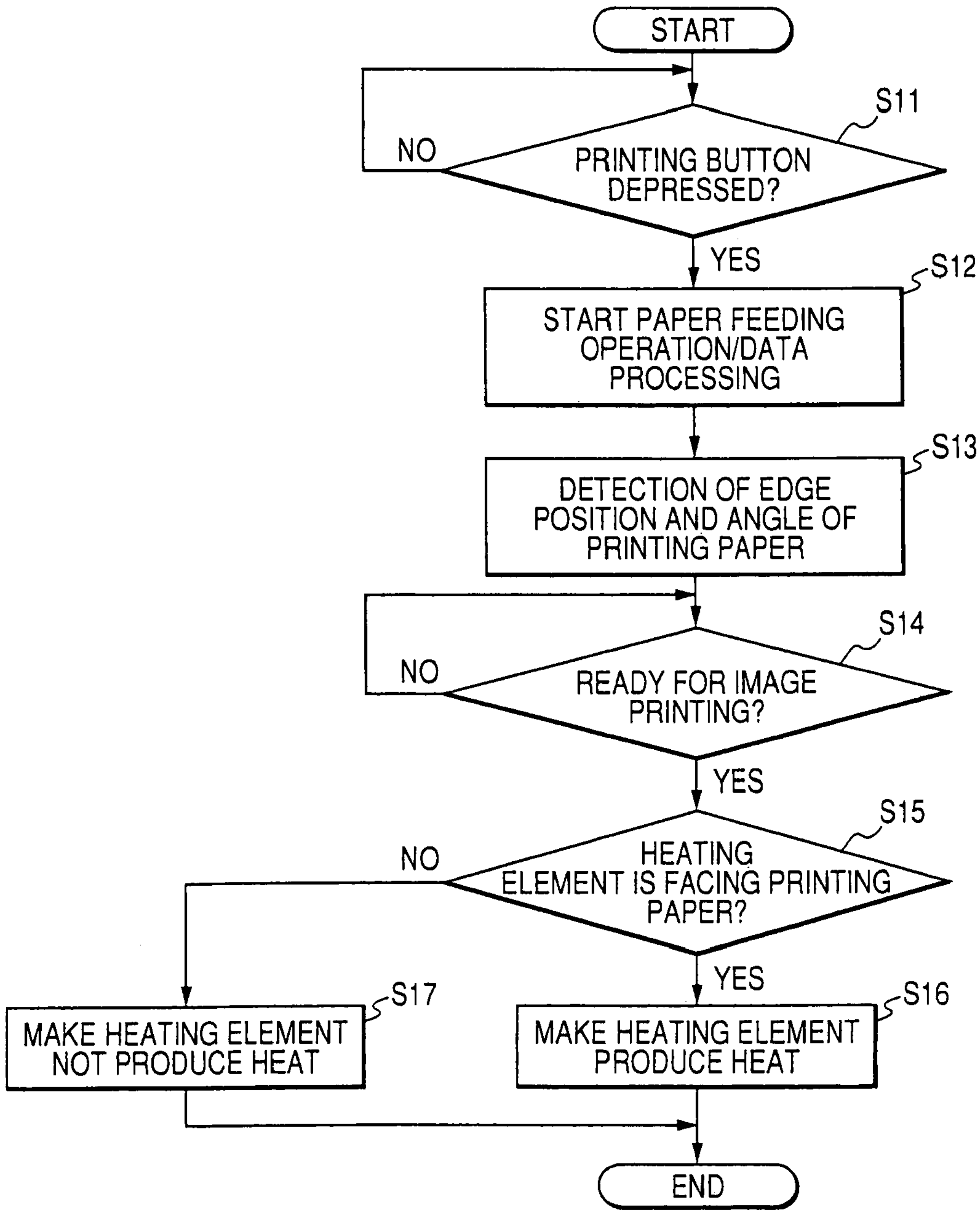
FIG. 22 is a flowchart showing the control procedure of a printing operation of a printing processing section under the control of the control section provided in the printer device body.

In the printer device 1, by following the procedure of the flowchart of FIG. 22, for example, the control section 183 provided to the printer device body 1100 exercises control over the printing operation to be executed by the printing processing section 154.

That is, the control section 183 determines whether the printing button 1104A provided to the device body 1100 is being depressed or not (step S11). When the printing button 1104A is depressed, the control section 183 makes the paper feed/eject section 158 in the printing processing section 154 start the paper feeding operation, and the image data processing section 120 go through a process of generating printing data (step S12). The control section 183 then exercises control over the heating resistors 22 in terms of energization, and goes through a process of edge position detection mode, i.e., detects the edge position and the angle of the printing paper 4 to be printed by the thermal head 2 (step S13). Such a process is executed based on any temperature increase observed in the heating resistors 22 as a result of energization.

The control section 183 then determines whether the printing operation is ready for execution (step S14), and when the printing operation gets ready, makes the printing processing section 154 start the image printing process, and the procedure goes to the process of a printing mode. Based on the process result of the edge position detection mode, the control section 183 then determines whether the heating resistors 22 are opposing the printing paper 4 (step S15). Based on the determination result in step S15, the control section 183 makes, to produce heat, any of the heating resistors 22 opposing the printing paper in the printing mode (step S16), but makes, not to produce heat, any of the heating resistors 22 not opposing the printing paper (step S17). As such, the control section 183 goes through the printing process by exercising control over the thermal head 2 in terms of current supply to the heating resistors 22. Note here that the control section 183 exercises control over the thermal head 2 in terms of current supply to the heating resistors 22 in such a manner that a predetermined temperature gradient can be derived at the edge position of the printing paper detected in the edge position detection mode.

Figure 23:
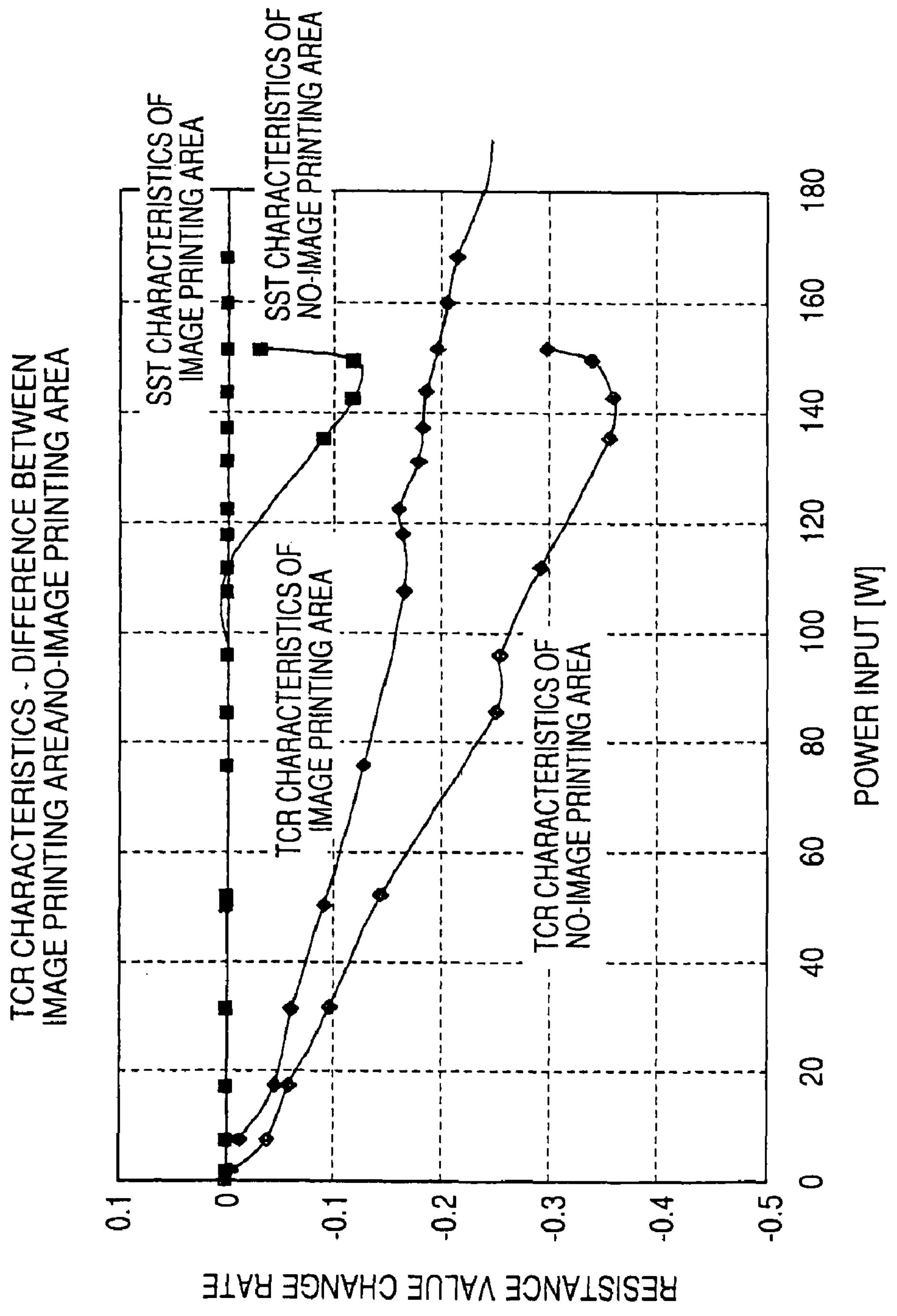
FIG. 23 is a characteristic diagram sowing the relationship, in terms of power input and resistance value change rate, of heating resistors configuring heat-producing portions of the thermal head in the printer device.

The heating resistors 22 configuring the heat-producing portions 22*a* generally have the temperature dependence, i.e., the resistance value is decreased in response to the temperature increase. The heating resistors 22 opposing the printing paper 4 have different heat releasing characteristics from those not opposing the printing paper 4 whether the heat is released via the printing paper 4 or not. Therefore, as exemplarily shown in FIG. 23, the rate of change varies among the resistance values when the heating resistors 22 are heated by energization.

Figure 24:
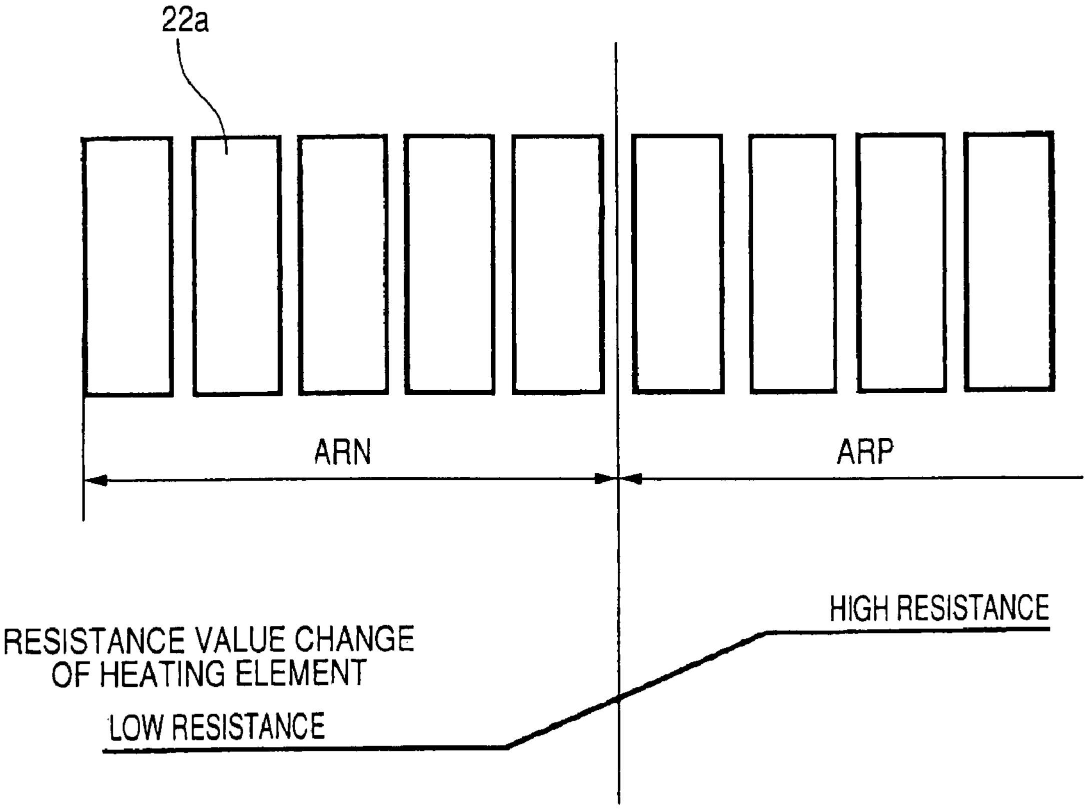
FIG. 24 is a schematic diagram showing the state of change observed in resistance values of the heat-producing portions of the thermal head in the vicinity of the edges of a printing paper in the printer device.

In consideration thereof, the control section 183 detects any change observed in the resistance values of the heating resistors by heating the heat-producing elements in the vicinity of the end portions of the printing paper 4 one by one through energization. As shown in FIG. 24, when the detection result tells that the rate of change varies among the resistance values of the heating resistors 22 via a border area between an image printing area ARP and no-image printing area ARN, the control section 183 determines that the portion of the border area as being an edge of the printing paper 4. Herein, the image printing area ARP is of the heating resistors 22 opposing the printing paper, and the no-image printing area ARN is of the heating resistors 22 not opposing the printing paper.

Figure 25:
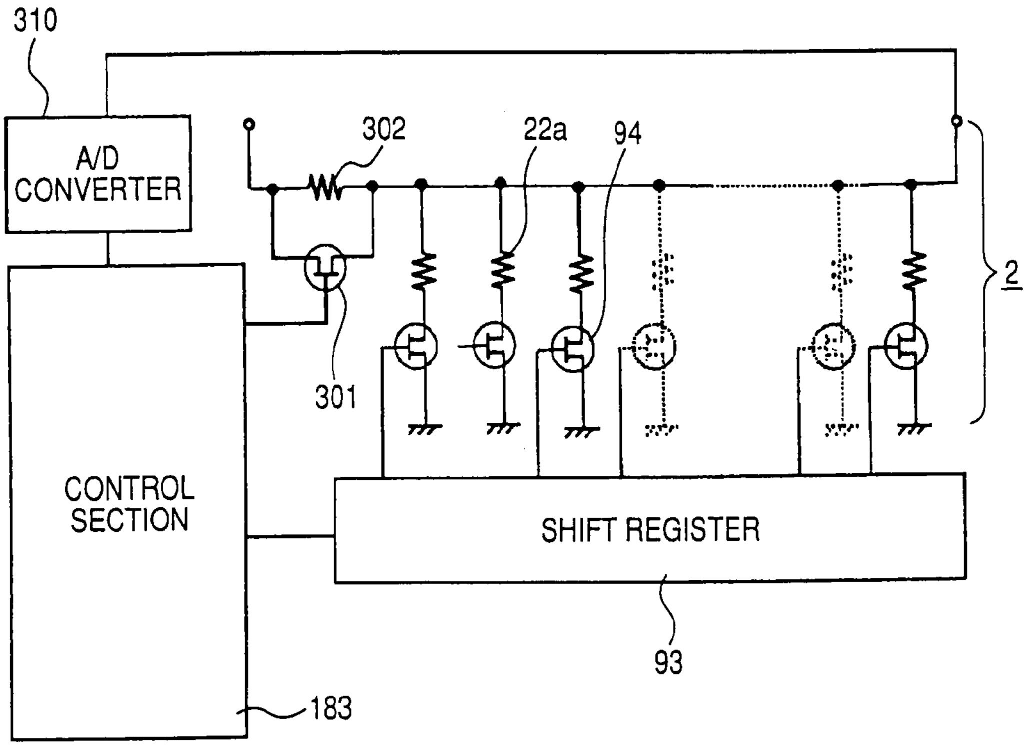
FIG. 25 is a schematic circuit diagram showing the state of connection between the heating resistors configuring the heat-producing portions of the thermal head in the printer device and the control section.

As shown in FIG. 25, in the printer device 1, a driving power is supplied to the heat-producing portions 22*a* via parallel-connected switching elements 301 and a reference resistance 302. The driving power supply voltage for application to the heat-producing portions 22*a* of the thermal head 2 is detected by the control section 183 via an A/D converter 310.

Figure 26:
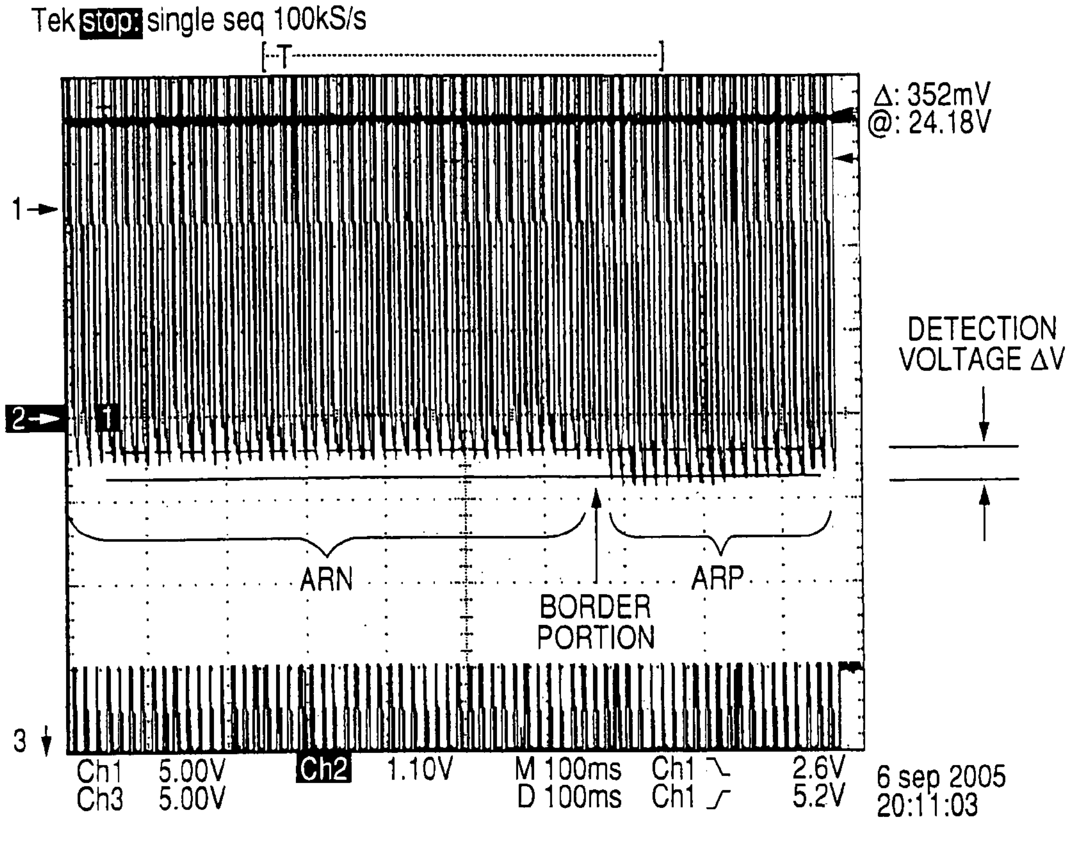
FIG. 26 is a waveform diagram of the detected waveform of a driving power supply voltage to be applied to the heat-producing portions in a process of edge position detection mode, i.e., any heat-producing bodies in the vicinity of end portions of a printing paper are heated via a reference resistance by sequential energization one by one.

In the process of edge position detection mode, the control section 183 opens the switching elements 301 connected in parallel to the reference resistance 302 to make a supply of driving power to the heat-producing portions 22*a* via the reference resistance 302. The control section 183 also closes, selectively one by one, the switching elements 94 connected in series to the heat-producing portions 22*a* via the shift register 93 to detect the driving power supply voltage to be supplied to the heat-producing portions 22*a*. FIG. 26 shows the detected voltage waveform of the driving power supply voltage to be applied to the heated heat-producing portions 22*a* in the process of edge position detection mode. The heat-producing portions 22*a* are those heated when the heat-producing elements in the vicinity of the edge portions of the printing paper are energized sequentially one by one via the reference resistance 302.

That is, in the edge position detection mode, the control section 183 sequentially energizes the heating resistors 22 via the reference resistance 302, and detects any change observed in the resistance values of the heating resistors 22 as the voltage decreased by the reference resistance 302. Through such detection, based on the change observed in the resistance values caused by the temperature increase of the heating resistors 22 of the thermal head 2, the control section 183 serves as edge position detection means for detecting the edge positions of the printing paper 4 for image printing by the thermal head 2.

Note here that the change of temperature increase observed in the heating resistors 22 as a result of energization can be also detected in real time.

Alternatively, the control section 183 may detect any change of temperature increase observed in the heating resistors 22 as a result of energization using a temperature sensor such as thermocouple, and may detect the edge positions of a printing paper based on the detection output.

In the printing mode, the control section 183 serves also as power feeding control means for exercising control over the thermal head in terms of power feeding to the heating resistors 22 located where there is no printing paper. Such control is applied based on the detection result in the edge position detection mode.

As such, based on the process result of the edge position detection mode, a determination is made whether or not the heating resistors 22 are opposing the printing paper. In the printing mode, the printing process is executed through control over the power feeding to the heating resistors 22 of the thermal head in such a manner that any of the heating resistors 22 opposing the printing paper is made to produce heat but not the remaining heating resistors 22 not opposing the printing paper (step S16). This accordingly protects, from excessive heating, the heating resistors 22 located where there is no printing paper, thereby increasing the durability of the thermal head.

In the edge position detection mode, the control section 183 sequentially energizes the heating resistors 2 one by one, and goes through the edge position detection based on the rate of change varying among the resistance values of the heating resistors 22 via a border area between an image printing area ARP of the heating resistors 22 opposing the printing paper and no-image printing area ARN of the heating resistors 22 not opposing the printing paper. Alternatively, the control section 183 may increase the detection sensitivity by making any adjacent elements produce heat at the same time.

Figure 27:
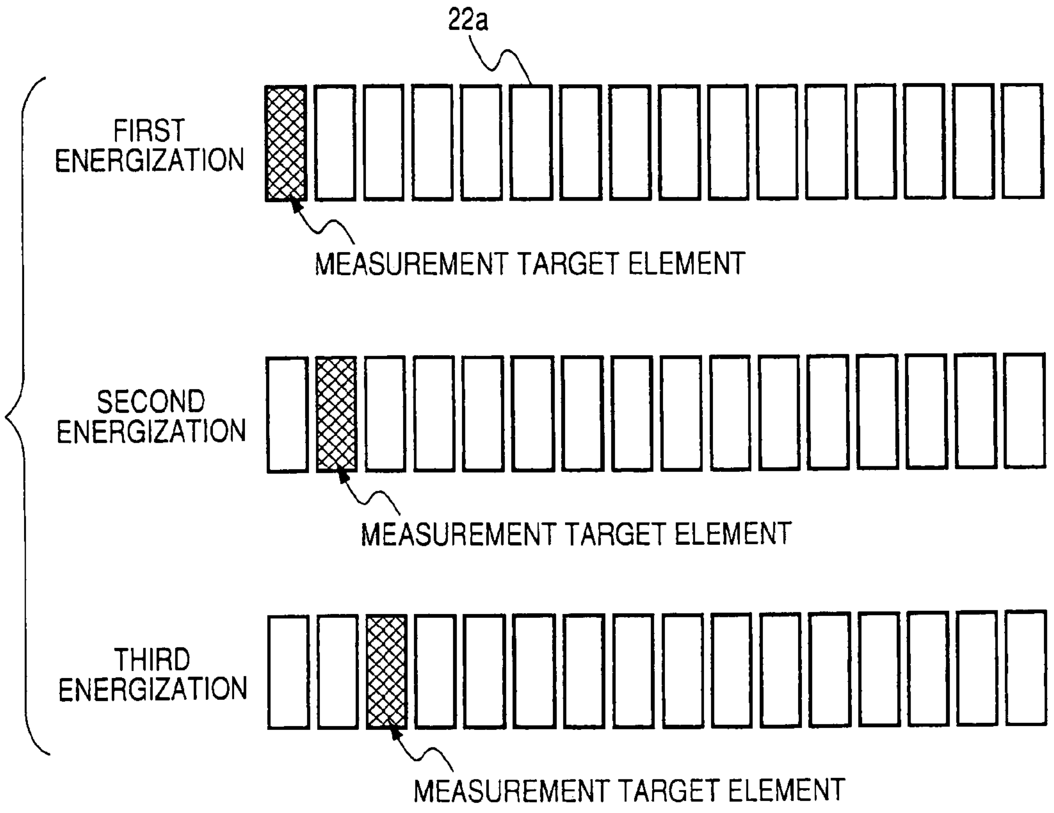
FIG. 27 is a diagram showing an energization method of making, to produce heat, the heat-producing elements by sequential energization one by one.
Figure 28:
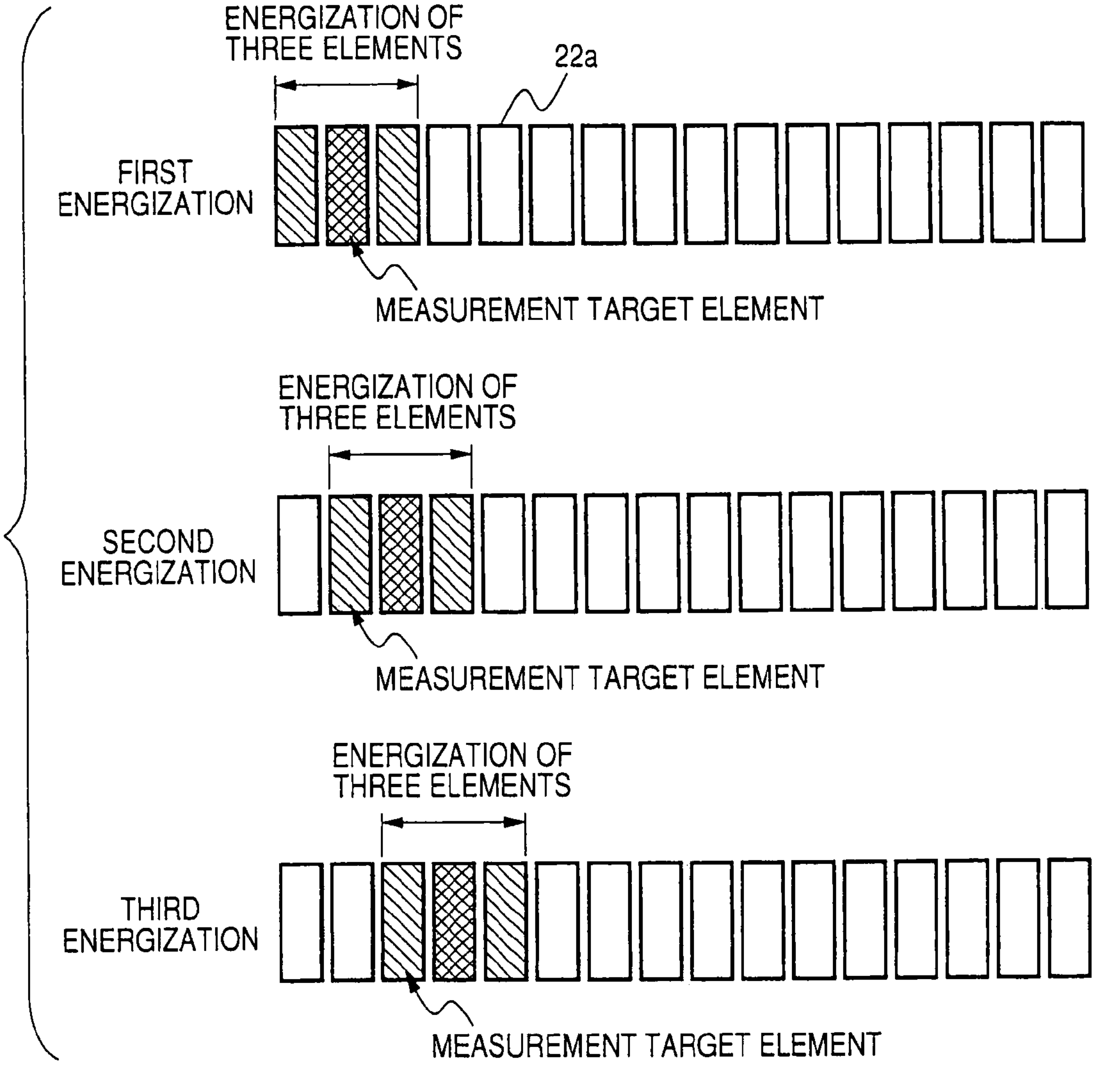
FIG. 28 is a diagram showing an energization method of energizing a unit of three heat-producing elements all at once, and making, to produce heat, the heat-producing elements on the unit basis with the sequential shift of one element at a time.
Figure 29:
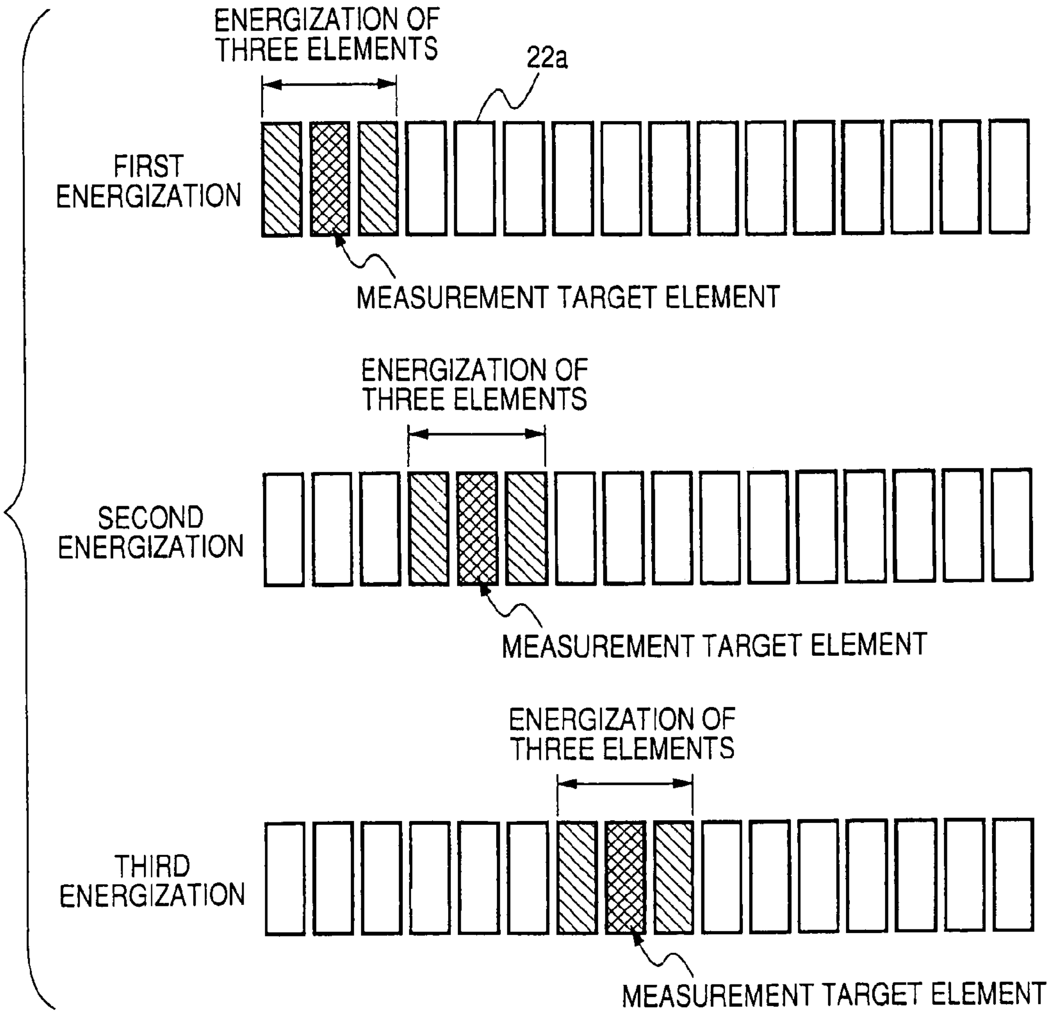
FIG. 29 is a diagram showing an energization method of energizing a unit of three heat-producing elements all at once, and making, to produce heat, the heat-producing elements on the unit basis with the sequential shift of three elements at a time.
Figure 30:
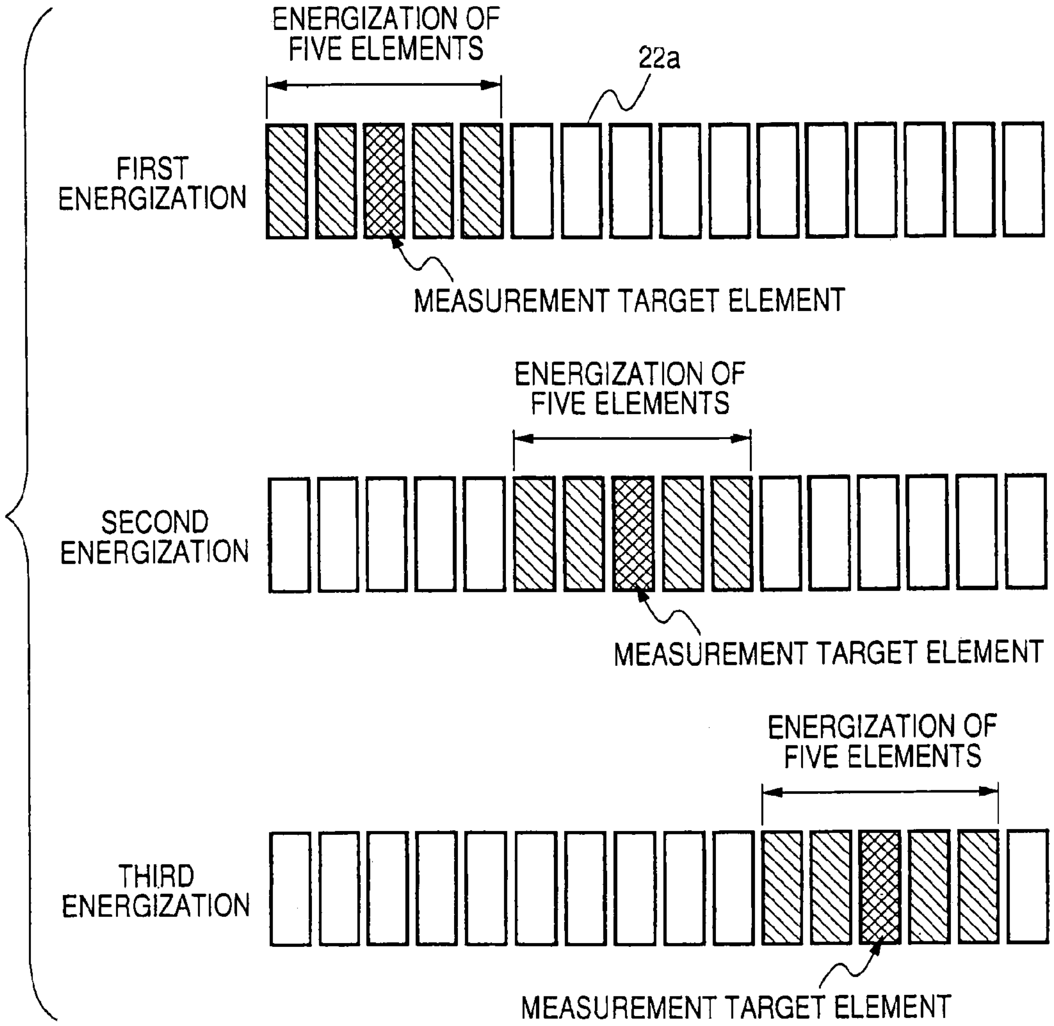
FIG. 30 is a diagram showing an energization method of energizing a unit of five heat-producing elements all at once, and making, to produce heat, the heat-producing elements on the unit basis with the sequential shift of five elements at a time.
Figure 31:
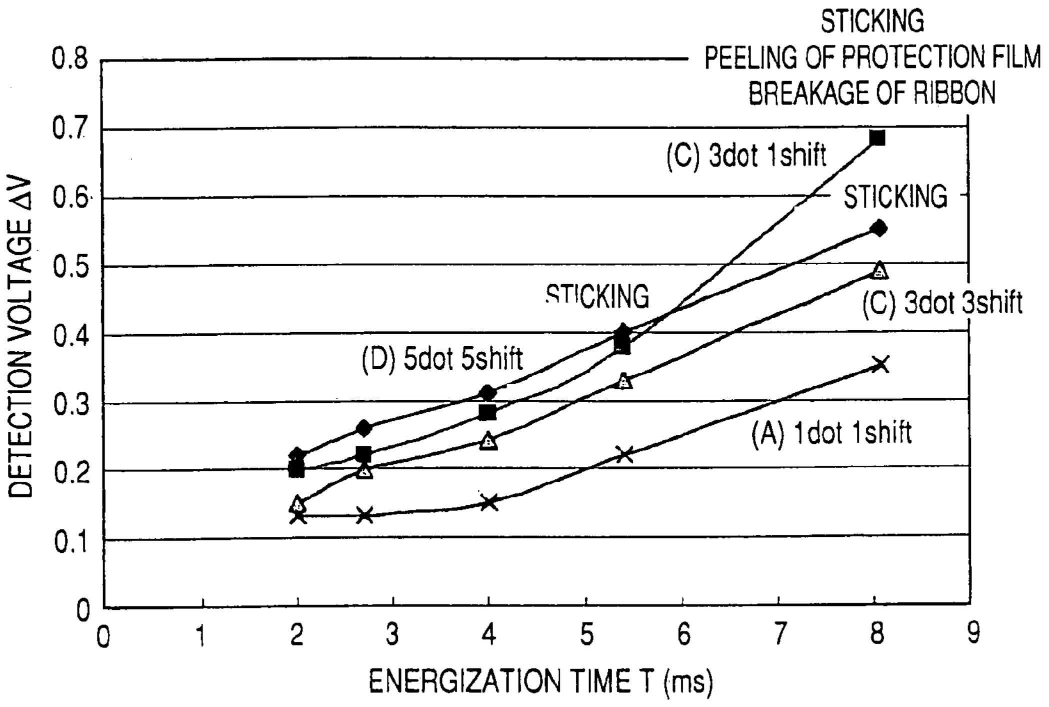
FIG. 31 is a characteristic diagram showing the measurement result of a detection voltage for the element at the center in accordance with any change observed in a resistance value thereof under various energization times and methods.

In the heating resistors 22, the voltage ΔV is measured for the element in the center (measurement target element) in accordance with any change observed in the resistance value thereof under various energization times T with various energization methods of A to D, i.e., A. as shown in FIG. 27, an energization method of making, to produce heat, the heat-producing elements by sequential energization one by one;

B. as shown in FIG. 28, an energization method of energizing a unit of three heat-producing elements all at once, and making, to produce heat, the heat-producing elements on the unit basis with the sequential shift of one element at a time;

C. as shown in FIG. 29, an energization method of energizing a unit of three heat-producing elements all at once, and making, to produce heat, the heat-producing elements on the unit basis with the sequential shift of three elements at a time; and D. as shown in FIG. 30, an energization method of energizing a unit of five heat-producing elements all at once, and making, to produce heat, the heat-producing elements on the unit basis with the sequential shift of five elements at a time. As a result of measurement as such, as shown in FIG. 31, compared with the energization method of A, the energization methods of B to D show the higher detection sensitivity.

With the energization method of C, no damage is observed in the heat-producing elements such as sticking with the energization time of 5 to 8 ms.

With the energization method of B, if with the energization time of 5.5 ms, the ribbon sticks to the head, and if with the energization time of 8 ms, the protection film of the head is peeled off, and the ribbon breaks. With the energization method of D, if with the energization time of 8 ms, the ribbon sticks to the head.

As such, the energization method of C can reduce the damage of the heat-producing elements, and increase the detection sensitivity.

Figure 32:
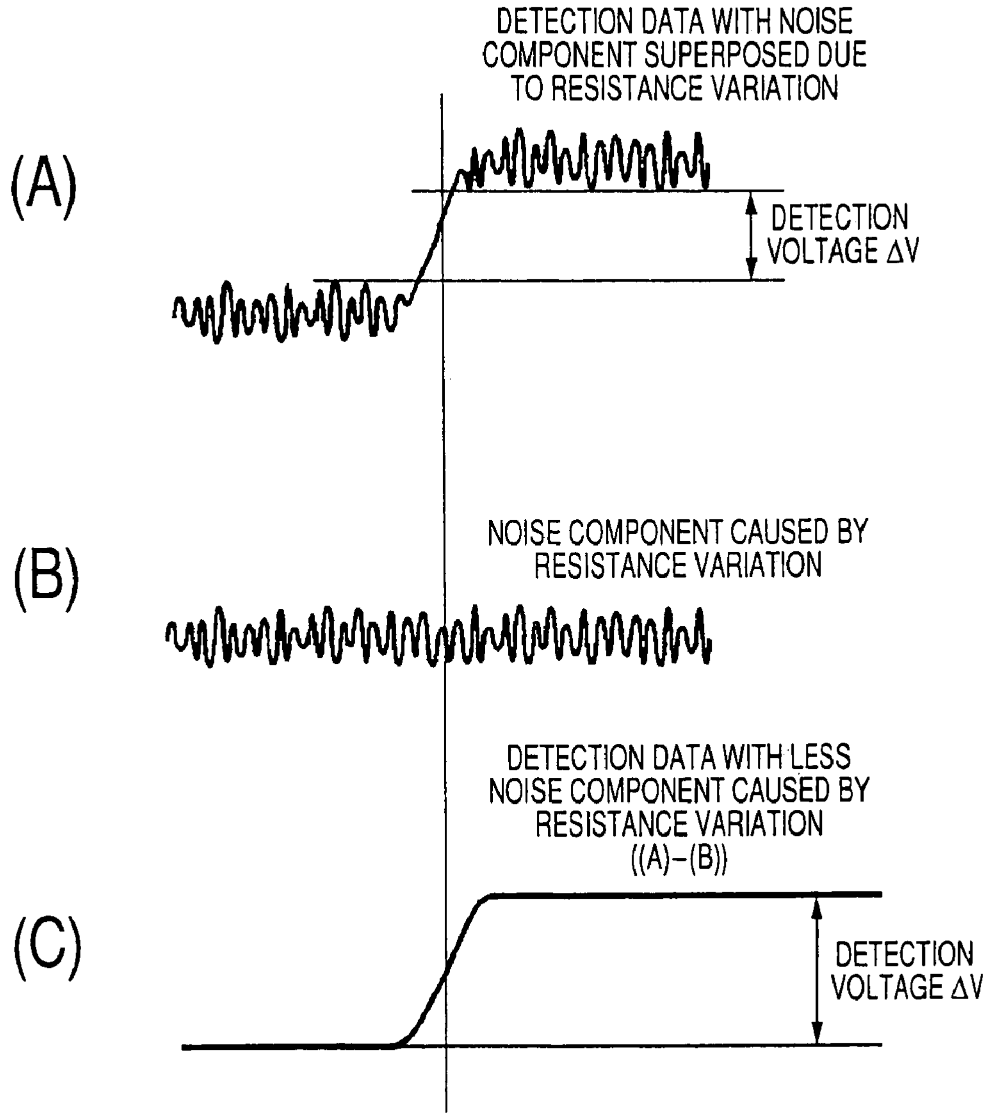
FIG. 32 is a waveform diagram showing the method of improving the detection sensitivity through reduction of a noise component caused by the variation of the resistance values of heating resistors.

Because the heating resistors 22 of the head vary in resistance value, as shown in (A) of FIG. 32, the detection data derived in the edge position detection mode, i.e., a change of detected voltage, is subjected to a measurement in the state that the variation of the resistance values is superposed as a noise component. As shown in (B) of FIG. 32, the control section 183 first measures an initial resistance value of each of the heating resistors 22 with no printing paper, and then takes a difference from the detection data. This enables to, as shown in (C) of FIG. 32, reduce the noise component being the variation of the resistance values, and increase the detection sensitivity.

Figure 33:
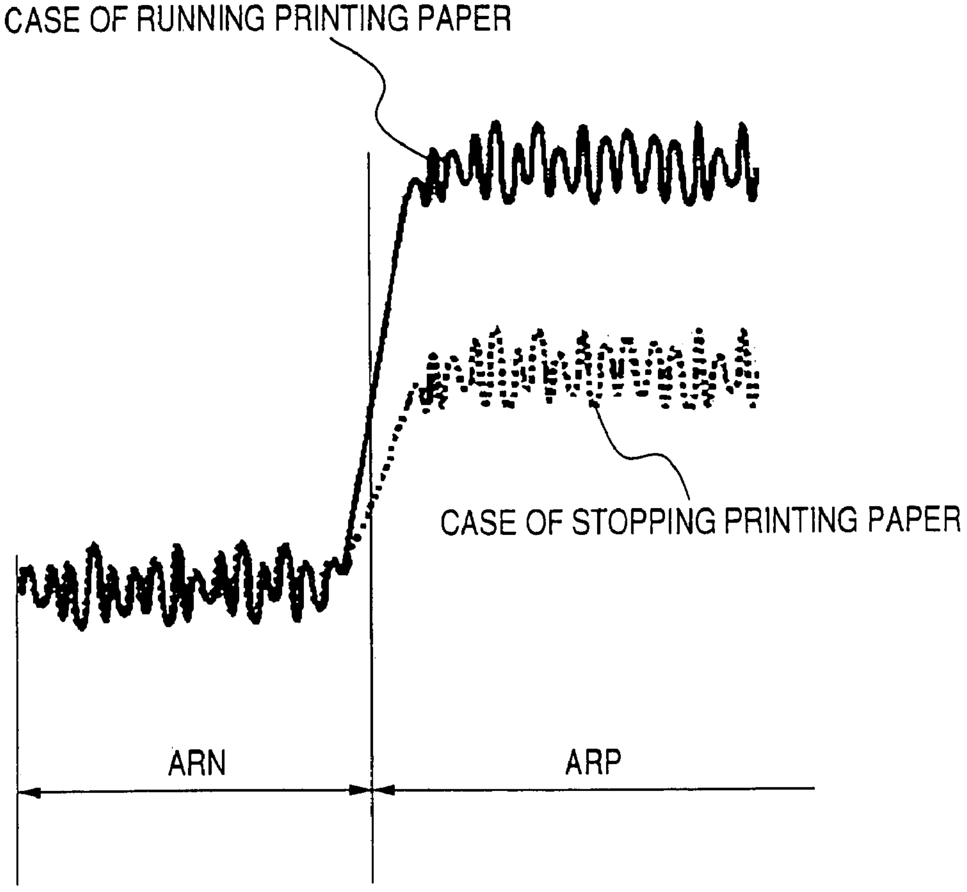
FIG. 33 is a waveform diagram of a detection voltage when a printing paper is made to run in an edge position detection mode.

Moreover, because the printing paper 4 absorbs the heat when running, the control section 183 may go through the process of edge position detection mode while making the printing paper 4 run. With this being the case, as shown in FIG. 33, the temperature difference can be increased between the image printing area ARP of the heating resistors 22 opposing the printing paper and no-image printing area ARN of the heating resistors 22 not opposing the printing paper. This accordingly enables to detect the change of the resistance values with high sensitivity.

Figure 34:
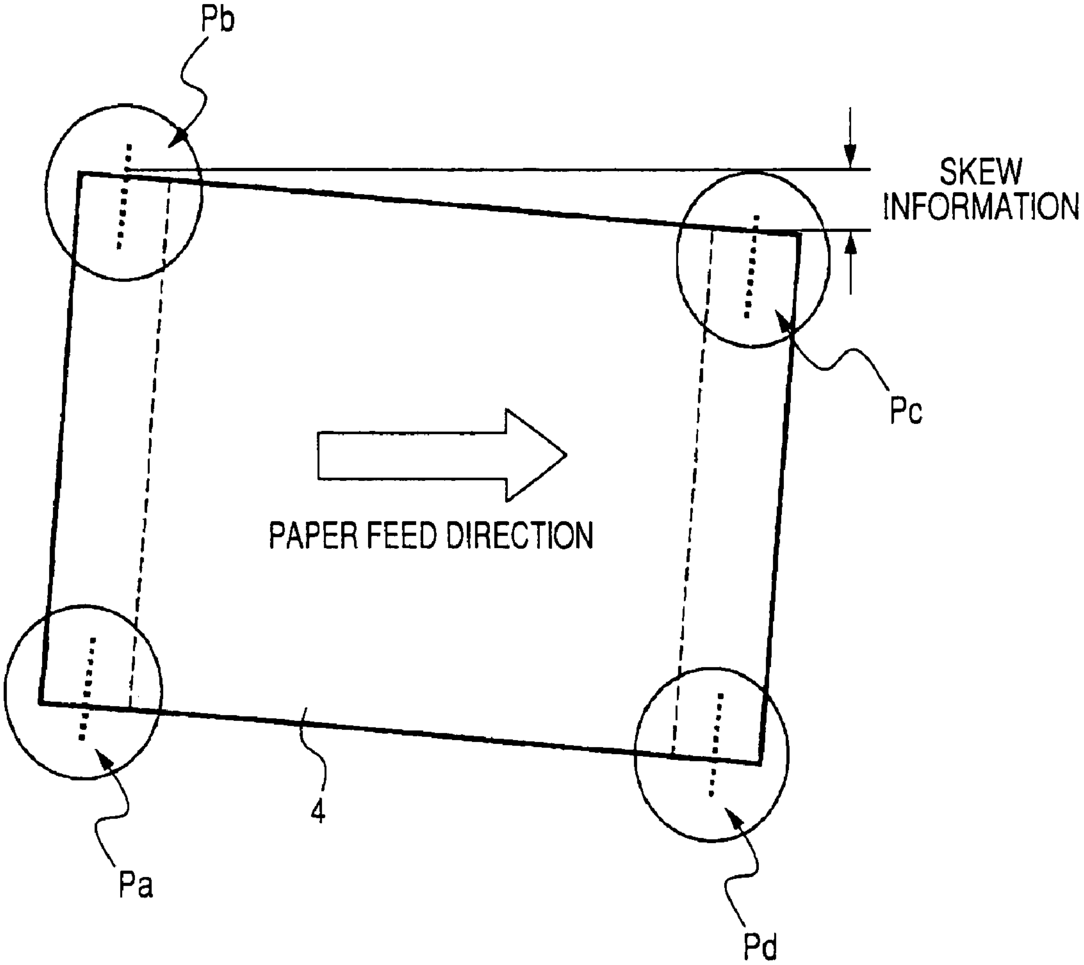
FIG. 34 is a schematic diagram showing the edge detection position in the edge position detection mode.

As shown in FIG. 34, in the edge position detection mode, when the printing paper 4 comes, the control section 183 performs edge position detection with respect to the paper at its four corners of Pa, Pb, Pc, and Pd. Through edge position detection as such, the control section 183 can detect skew information Dsq at the time of image printing, and by feeding back the skew information Dsq for reflection to the control over the no-image printing area, the printing result with any skew corrected can be derived at the time of image printing.

In the edge position detection mode, for edge position detection at the four corners of Pa, Pb, Pc, and Pd of the printing paper 4, in principle, any change of the resistance values will be detected at the four corners of Pa, Pb, Pc, and Pd of the printing paper 4 with 256 elements of 64 elements (corresponding to about 5.2 mm)×4 as the measurement target elements. In this case, the first detection result is used as a basis to estimate, using the paper width, the edge position for the second and later detections so that the detection range is narrowed down. This accordingly reduces the number of the measurement target elements, and the detection time can be thus shortened.

Figure 35:
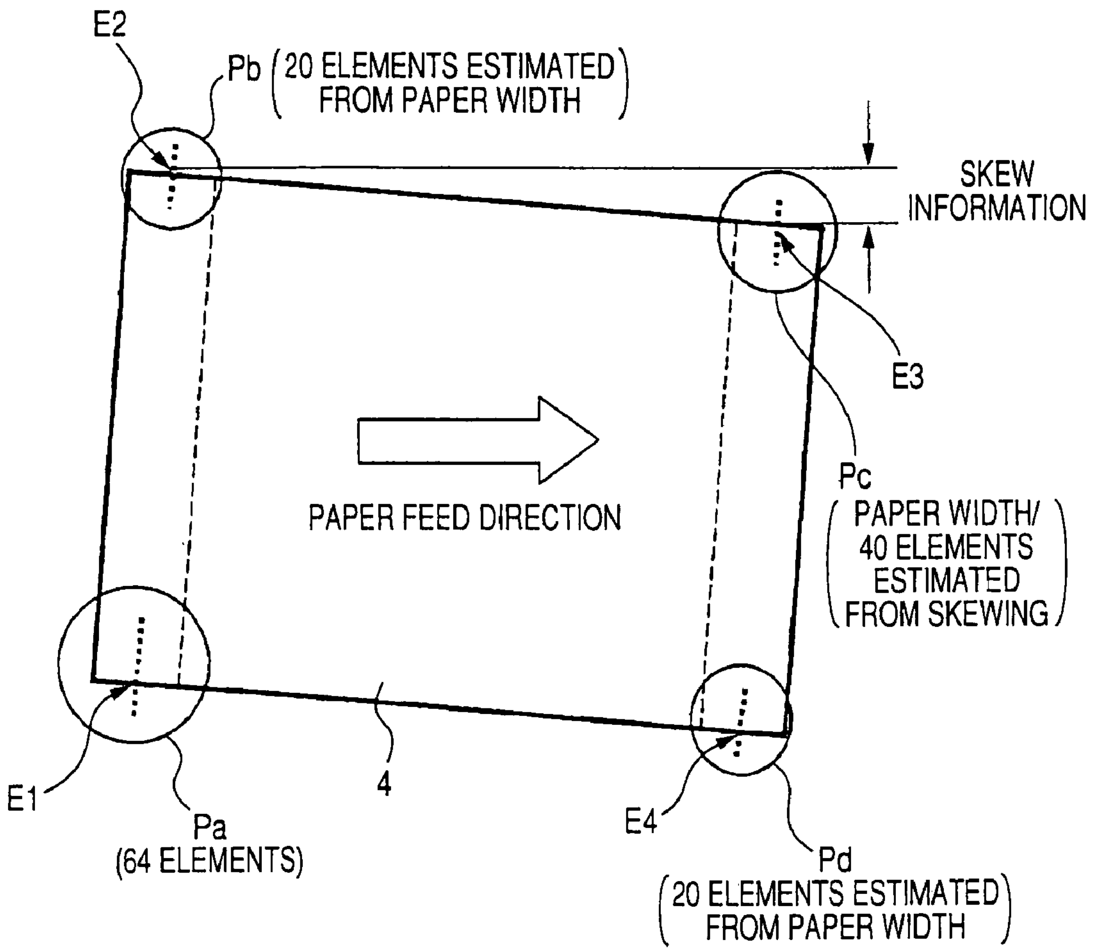
FIG. 35 is a schematic diagram showing a method of reducing the detection time by narrowing down a detection range based on the first detection result in the edge position detection mode, i.e., estimating the edge position for the second and later detections based on the paper width.

As an example, as shown in FIG. 35, for the first detection, an edge position E1 is detected by detecting any change observed in the resistance values of 64 elements. Based on the detection result, an edge position E2 is estimated using the paper width for the second detection so that the detection range is narrowed down. Any change of the resistance values is then detected for the 20 elements so that the edge position E2 is detected. Based on the detection result, the paper width, and the skew, an edge position E3 is estimated for the third detection so that the detection range is narrowed down. Any change of the resistance values is then detected for the 45 elements so that the edge position E3 is detected. Based on the detection result, an edge position E4 is estimated using the paper width w for the fourth detection so that the detection range is narrowed down. Any change of the resistance values is then detected for the 20 elements so that the edge position E4 is detected. As such, the detection range is narrowed down by estimating, using the paper width, the edge position for the second and later detections based on the first detection result, and thus the number of the measurement target elements is reduced to almost a half, i.e., 256 elements to 149 elements. Accordingly, by detecting any change observed in the resistance values, the edge positions E1 to E4 can be detected at the four corners of Pa, Pb, Pc, and Pd of the printing paper 4 so that the detection time can be reduced to about a half.

Figure 36:
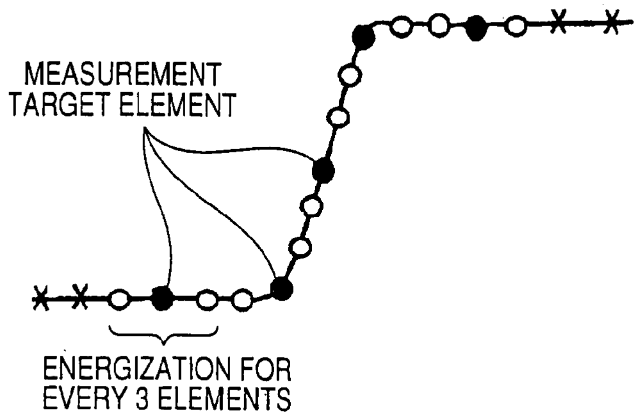
FIG. 36 is a schematic diagram showing another method of reducing the detection time by performing edge position detection with the energization method of making, to produce heat, a unit of three elements with the sequential shift of three elements at a time, and then by performing edge position detection on an element basis at the detected edge position.

As shown in FIG. 36, exemplified here is a case where 22 elements are subjected to edge position detection with the energization method of C, i.e., i.e., making, to produce heat, 64 elements in a detection area for every unit of three with the sequential shift of three elements at a time, and edge position detection is performed at the detected edge position to the eight elements on an element basis. In this case, (22 elements+8 elements)×4=120 elements are subjected to detection of any change observed in the resistance values, and the edge positions E1 to E4 can be detected at the four corners of Pa, Pb, Pc, and Pd of the printing paper 4 so that the detection time can be reduced to about a half. With a combination of the method, i.e., narrowing down the detection range by estimating, using the paper width, the edge position for the second and later detections based on the first detection result, the measurement target elements for the first detection will be (22 elements+8 elements), (7 elements+8 elements) for the second detection, (15 elements+8 elements) for the third detection, and (7 elements+8 elements) for the fourth detection. As such, the 83 elements are subjected to a detection of any change observed in the resistance values, thereby detecting the edge positions E1 to E4 at the four corners of Pa, Pb, Pc, and Pd of the printing paper 4. This favorably reduces the detection time to about one third.

Figure 37:
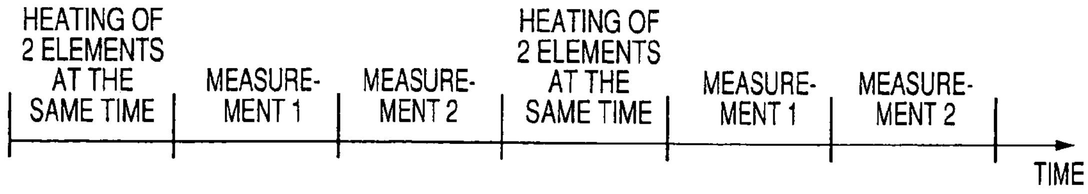
FIG. 37 is a schematic diagram showing the method of reducing the detection time by first heating a plurality of elements through energization all at once, and then detecting any change observed in the resistance values.

Alternatively, to reduce the detection time, a plurality of elements may be heated by energization all at once, and any change will be detected for the resistance values as shown in FIG. 37. With this being the base, there needs to heat at the same time the elements located away for the aim of avoiding any mutual thermal effects.

Figure 38:
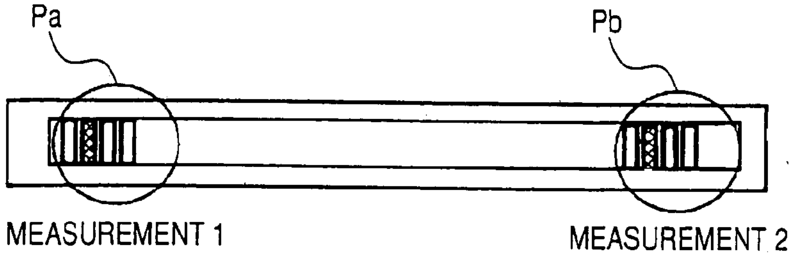
FIG. 38 is a schematic diagram showing an example of heating the elements in the first and second detection areas through energization all at once.

As an example, as shown in FIG. 38, the elements in the first and second detection areas are heated by energization all at once, and any change observed in the resistance values may be detected. If this is the case, the detection time can be reduced to about a half.

Figure 39:
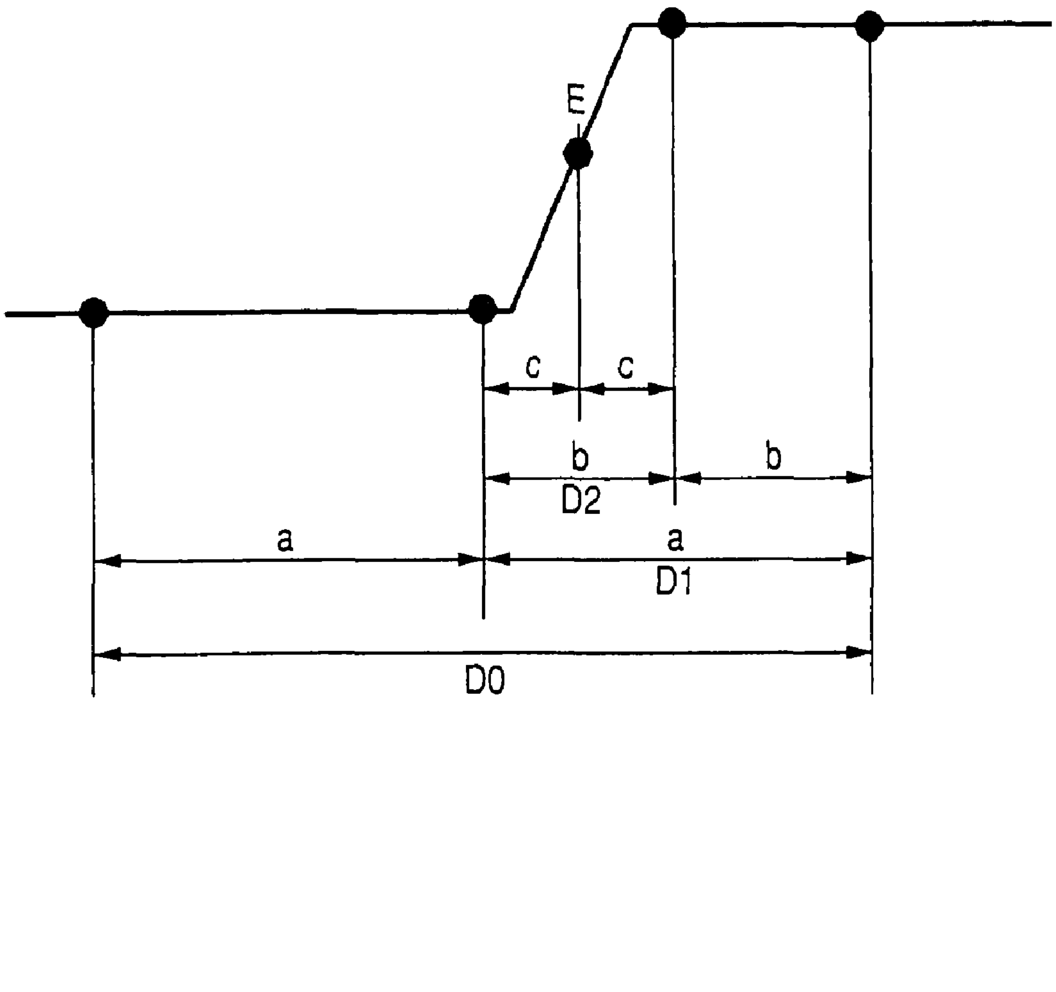
FIG. 39 is a schematic diagram showing another method of reducing the detection time in the edge position detection mode.

As shown in FIG. 39, to shorten the detection time, still alternatively, elements at both ends of a detection area D0 may be heated by energization all at once as the measurement target elements for detection of a change of resistance values. Next, the element at the center of the detection area D0 may be heated by energization as the measurement target element for detection of a change of resistance values. Thus detected change is compared with the previously-detected change, thereby specifying a detection range D1 on the side including the edge position E. The element at the center of the detection range D1 on the side including the edge position E is then heated by energization as the measurement target element for detection of a change of resistance values. Thus detected change is compared with the previously-detected change, thereby specifying a detection range D2 on the side including the edge position E. By repeating such a process, the detection time can be also shortened.

It should be understood by those skilled in the art that various modifications, combinations, sub-combinations and alterations may occur depending on design requirements and other factors insofar as they are within the scope of the appended claims or the equivalents thereof.

What is claimed is:

1. A printer device that prints an image to a printing paper using a thermal head formed with a plurality of heating resistors, the device comprising:

edge position detection means for performing four edge position detections in the vicinity of and related to four corners of an incoming printing paper using the thermal head based on a change of temperature increase observed in, as a result of energization, any of the heating resistors opposing the printing paper and the remaining heating resistors not opposing the printing paper;

and control means for exercising control over an image printing operation by the thermal head based on a detection output derived by the edge position detection means, wherein said exercising control comprises correcting a skew of the incoming paper by adjusting the image printing operation by the thermal head.

2. The printer device according to claim 1, wherein based on a detection result derived for a first corner, the edge position detection means estimates an edge position for a second and later corners using a paper width, and performs the edge position detection with a narrower detection range.

3. The printer device according to claim 1 or 2, wherein with a unit of elements predetermined in number for each of the heating resistors located at a detection area, by energizing each of the heating resistors on the unit basis with a sequential shift of one unit at a time, the edge position detection means performs the edge position detection by detecting a resistance value change of a measurement target element at a center of each of the units, and performs the edge position detection at a detected edge position on a element basis.

4. The printer device according to claim 1, wherein based on a resistance value change caused by a temperature increase of each of the heating resistors of the thermal head, the edge position detection means performs the edge position detection to the printing paper using the thermal head.

5. The printer device according to claim 4, wherein the edge position detection means includes a reference resistance that is collectively connected to each of the heating resistors of the thermal head, sequentially energizes the heating resistors via the reference resistance, and detects the resistance value change observed in each of the heating resistors as a descending voltage by the reference resistance.

6. The printer device according to claim 5, wherein the edge position detection means includes switching means for collectively connecting the reference resistance to each of the heating resistors of the thermal head in an edge position detection mode, and in a printing mode, cutting off the reference resistance from each of the heating resistors.

7. A printer device that prints an image to a printing paper using a thermal head formed with a plurality of heating resistors, the device comprising:

an edge position detection section performing four edge position detections in the vicinity of and related to four corners of an incoming printing paper using the thermal head based on a change of temperature increase observed in, as a result of energization, any of the heating resistors opposing the printing paper and the remaining heating resistors not opposing the printing paper;

and a control section exercising control over an image printing operation by the thermal head based on a detection output derived by the edge position detection section, wherein said exercising control comprises correcting a skew of the incoming paper by adjusting the image printing operation by the thermal head.

* * * * *